(12) United States Patent
Muhammed

(10) Patent No.: US 8,446,458 B2
(45) Date of Patent: May 21, 2013

(54) MINIATURIZED ALL-REFLECTIVE HOLOGRAPHIC FOURIER TRANSFORM IMAGING SPECTROMETER BASED ON A NEW ALL-REFLECTIVE INTERFEROMETER

(76) Inventor: Hamed Hamid Muhammed, Norsborg (SE)

( * ) Notice: Subject to any disclaimer, the term of this patent is extended or adjusted under 35 U.S.C. 154(b) by 448 days.

(21) Appl. No.: 12/744,690

(22) PCT Filed: Dec. 1, 2008

(86) PCT No.: PCT/SE2008/051384
§ 371 (c)(1),
(2), (4) Date: Oct. 29, 2010

(87) PCT Pub. No.: WO2009/070121
PCT Pub. Date: Jun. 4, 2009

(65) Prior Publication Data
US 2011/0050845 A1    Mar. 3, 2011

Related U.S. Application Data

(60) Provisional application No. 60/991,341, filed on Nov. 30, 2007.

(51) Int. Cl.
*G01J 3/26* (2006.01)
*G01J 3/45* (2006.01)
*G01J 3/40* (2006.01)

(52) U.S. Cl.
USPC ............ 348/40; 356/302; 356/457; 356/456; 356/513

(58) Field of Classification Search
USPC .................................................. 356/456, 457
See application file for complete search history.

(56) References Cited

U.S. PATENT DOCUMENTS 3,519,816 A * 7/1970 Wright et al. ............ 250/339.13
3,625,584 A * 12/1971 St. John ........................ 359/26

(Continued)

FOREIGN PATENT DOCUMENTS

JP       08016083 A  *  1/1996
JP    2000088649 A       2/2000

OTHER PUBLICATIONS

NI Agladze and AJ Sievers, "Miniaturization of holographic Fourier-transform spectrometers", Dec. 2004, Applied Optics, vol. 43, No. 36, 20.

(Continued)

*Primary Examiner* — Sath V Perungavoor
*Assistant Examiner* — Matthew J Anderson
(74) *Attorney, Agent, or Firm* — Young & Thompson

(57) ABSTRACT

A miniaturized Holographic Fourier transform imaging spectrometer HFTIS, made from simple all-reflective components and with no moving parts, is provided. This HFTIS includes an all-reflective two beam interferometer, which provides two interfering beams; a two-dimensional detector array to detect the interference pattern created by the beams; a computing machine for correcting the distortions in the pattern and calculating the spectrum from the corrected interferogram. The same principle can be used to build spot spectrometers, line-scan imaging spectrometers (also called array spectrometers or line-scan hyperspectral cameras) as well as two-dimensional instantaneous imaging spectrometers (also called staring hyperspectral cameras). In all variants of HFTIS that can be built using this invention, the wave-signal collecting element can also be built of all-reflective components. Digital correction can be utilized to straighten the interference fringes and to compensate for the impact of used lenses and other refractive components, to produce correct spectra after Fourier Transformation.

50 Claims, 14 Drawing Sheets

U.S. PATENT DOCUMENTS

| | | | | |
|---|---|---|---|---|
| 5,428,635 | A * | 6/1995 | Zhiglinsky et al. | 372/92 |
| 5,579,106 | A * | 11/1996 | Kremer | 356/328 |
| 5,859,417 | A * | 1/1999 | Dvorkis et al. | 235/462.39 |
| 6,069,969 | A * | 5/2000 | Keagy et al. | 382/124 |
| 6,097,863 | A * | 8/2000 | Chowdhury | 385/37 |
| 6,647,182 | B2 * | 11/2003 | Sappey et al. | 385/37 |
| 6,721,057 | B1 * | 4/2004 | Reininger | 356/520 |
| 6,879,396 | B2 * | 4/2005 | Kaneko et al. | 356/334 |
| 6,930,781 | B2 * | 8/2005 | Agladze et al. | 356/456 |
| 6,963,405 | B1 * | 11/2005 | Wheel et al. | 356/456 |
| 7,092,103 | B1 * | 8/2006 | Kendrick et al. | 356/497 |
| RE40,271 | E * | 4/2008 | Sappey et al. | 385/37 |
| 7,474,405 | B2 * | 1/2009 | Kranz et al. | 356/450 |
| 7,502,109 | B2 * | 3/2009 | Bonne et al. | 356/328 |
| 7,649,660 | B2 * | 1/2010 | Adibi et al. | 359/15 |
| 7,659,987 | B2 * | 2/2010 | Utsunomiya et al. | 356/445 |
| 8,154,732 | B2 * | 4/2012 | Bodkin et al. | 356/484 |
| 8,203,716 | B2 * | 6/2012 | Badleirostami et al. | 356/454 |
| 8,213,008 | B2 * | 7/2012 | Momtahan et al. | 356/326 |
| 8,218,212 | B2 * | 7/2012 | Kroll et al. | 359/29 |
| 8,350,893 | B2 * | 1/2013 | Lee et al. | 348/49 |
| 2004/0114148 | A1 | 6/2004 | Agladze et al. | |
| 2006/0066850 | A1 * | 3/2006 | Kimura | 356/328 |
| 2006/0140538 | A1 * | 6/2006 | Isano et al. | 385/37 |
| 2007/0195391 | A1 * | 8/2007 | Nishikawa et al. | 359/15 |

OTHER PUBLICATIONS

Dan Zhang et al, "Novel all-reflective Fourier transform imaging spectrometer based on Fresnel double-mirror", Nov. 2007, Proceedings of the SPIE, vol. 6786, No. 1, 15.

Min-Yong Liang and Ning-Fang Liao, "Study on optical design of all-reflective Fourier transform imaging spectrometer", Proceedings of the SPIE, Sep. 2007, vol. 6624, 2.

RA Kruger et al, New Fourier transform all-reflection interferometer, Mar. 1973, Applied Optics, vol. 12. No. 3.

International Search Report in Corresponding Application No. PCT/SE2008/051384 Dated Apr. 21, 2009.

* cited by examiner

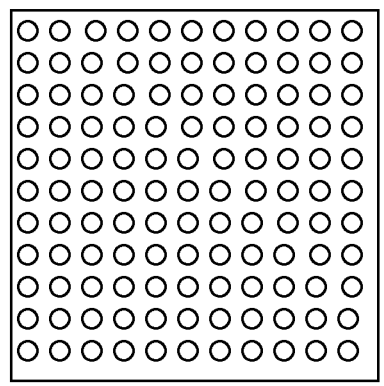
FIG. 18   251

MINIATURIZED ALL-REFLECTIVE HOLOGRAPHIC FOURIER TRANSFORM IMAGING SPECTROMETER BASED ON A NEW ALL-REFLECTIVE INTERFEROMETER

BACKGROUND OF THE INVENTION

Great progress has been achieved in building miniature non-scanning spectrometers, with no moving parts. Today's best non-scanning spectroscopy techniques are the Multi-Channel Dispersive Spectroscopy and the Holographic Fourier Transform Spectroscopy (HFTS) approaches, with a slight advantage for the latter one; the HFTS approach. A nice review study and a comparison between these techniques can be found in the article "Miniaturization of holographic Fourier-transform spectrometers", by Nikolay I. Agladze and Albert J. Sievers, in APPLIED OPTICS, Vol. 43, No. 36, Dec. 20, 2004, as well as U.S. Pat. No. 6,930,781 B2, Aug. 16, 2005.

However, there is still a need for ultra-miniaturized aberration-free (i.e. comprising all reflective components) imaging spectrometers. And to be able to achieve the best possible performance, it is desired to build HFTSs fulfilling the previously mentioned requirements. There is also a need for two-dimensional (2D) instantaneous imaging spectrometers (also called staring hyperspectral cameras) that can capture the whole image cube in one shot, without the need for scanning.

Achieving these goals will widen the usage of spectroscopy considerably, and will also help in developing non-invasive techniques for numerous applications, such as telemedicine & telediagnosis, healthcare & medical diagnosis such as cancer & inflammation, mammography, endoscopy (even wireless capsule endoscopy), telesurgery, law medicine, stress detection, estimation of the concentration of Alcohol, Glucose, Cholesterol, Oxygen and other substances in the blood (can also be done by examining the skin), environmental monitoring, precession agriculture, forestry, food safety & quality measurement, food inspection, industrial inspection, veterinary, security, surveillance, law enforcement, defense, hazard detection, poisonous & harmful gases detection, monitoring of chemical reactions, mining, space & astronomy and Earth monitoring. Near-infrared and/or visible-light spectroscopy can be used for these applications.

In the case of using visible-light spectroscopy, it is also possible not only to perform precision color measurement and correction (colorimetry, e.g. color printing, paint manufacturing, etc) and to compensate for the illumination, but also to simulate a desired lighting environment and to add high quality light effects to the 2D hyperspectral image and finally convert it into a color image. It is also possible to segment and cut an object from one image and paste it into another image after adjusting the colors and the lighting effects to match the new image. As examples can be making an Indian elephant walk on the street in New York, or seeing him/herself exercising on Mars or under water among sharks. Another new field is making hyperspectral movies where lighting and colors can be adjusted afterwards as the producer or even the viewer wishes—one can make his/her own version of the movie at home. Therefore, perfect studio-lighting will not be necessary, saving time and money.

Recent studies have shown that Fourier-transform infrared (FTIR) spectro-imaging enables determination of the biodistribution of several molecules of interest (such as carbohydrates, lipids, proteins) for tissue analysis without pre-analytical modification of the sample (such as staining) FTIR imaging can also reveal molecular structure information for protein secondary structure and fatty acyl chain peroxidation level. In other words, several cancer markers can be identified from FTIR tissue images, enabling accurate discrimination between healthy and tumour areas. Furthermore, FTIR imaging can provide unique chemical and morphological information about tissue status. Fast image acquisition techniques in the mid-infrared spectral range, makes it possible to analyze cerebral tumour exereses in delays compatible with neurosurgery. Accordingly, FTIR imaging will be taken into consideration for the development of new molecular histopathology tools.

In addition to the previously mentioned applications, achieving the spectrometer-design goals mentioned above is also desired within the application areas of Fourier Domain Confocal Optical Tomography, Fluorescence spectroscopy, Raman spectroscopy, IR (infrared) spectroscopy, X-ray spectroscopy, RF (radio frequency) spectroscopy, Microwave spectroscopy, Flame spectroscopy and Ultrasound spectroscopy.

SUMMARY OF THE INVENTION

Ultra-miniaturized aberration-free imaging spectrometers are highly desirable. The elegant novel design of HFTSs, which is introduced in this document, can make them significantly smaller than ever to provide a desired resolving power—smaller than both existing HFTSs and dispersive type spectrometers. Furthermore, it is possible to build instantaneous 2D imaging spectrometers by using this new design. By eliminating the need for scanning, we can get staring hyperspectral cameras that can capture the whole image cube in one shot, making it possible to acquire hyperspectral video, for the first time in the history of spectroscopy.

The basic principle of HFTS is to generate an interference pattern, then convert it into a spectrum by Fourier Transformation. The interference pattern is generated by mixing a wave signal with a successively phase-shifted version of this signal. The present invention suggests a new way of shifting the original signal and generating the interference pattern. Digital correction can be utilized to straighten the interference fringes to give correct spectra after Fourier Transformation. However, it is also possible to use spectra generated without applying any correction to the interference patterns. Simple optical systems can be used to achieve even more miniaturization. Digital aberration correction can be used to compensate for the impact of the lenses' and other refractive components, if any were used.

The wave signals are reflected by a pair of parallel cylindrical convex mirrors (cylindrical convex micro-mirrors are used in the case of measuring signals with wavelengths less than several tens micrometers) to generate successively phase-shifted signals that interfere with each others and generate an interference pattern. FIG. 1c presents a cut section of such a construction. This novel construction design can be considered as a reflective variant of Young's interferometer (FIG. 1a shows a cut section of a double-slit interferometer), in addition to magnifying the generated interference pattern (by using convex mirrors) so that much shorter distance, between said pair of parallel cylindrical convex mirrors and the imaging sensor which captures said interference pattern, is required to be able to easily resolve said interference pattern. Said magnification factor will be decreased if said parallel cylindrical convex mirrors are flattened, so that using plane mirrors instead will make said magnification factor equals one; i.e. identical interference patterns are obtained when using the interferometers in FIGS. 1a and 1b, if the two constructions in these figures have the same dimensions. FIG. 1b presents a construction using flat mirrors.

In another reflective-variant of Young's interferometer, it is also possible to use a pair of parallel cylindrical concave mirrors instead of said pair of parallel cylindrical convex mirrors, as shown in FIG. 1d.

Said imaging sensor must be able to detect the wave signals which generated the interference pattern. The used mirrors must also be able to reflect these wave signals to be able to achieve the desired result. Using silver-coated mirrors and a monochrome CMOS or CCD imaging sensor will give a system that is able to generate interference patterns within the near ultraviolet, visible and the near infrared spectral regions. Said imaging sensor can either be of a single-layered or a multi-layered type; e.g. the X3 3-layered CMOS imaging sensor. Said imaging sensor can either be of a cooled or a non-cooled type. After transforming the resulting interference patterns into spectra, by using Fourier Transform, a spectrometer, covering the near ultraviolet, visible as well as the near infrared spectral regions, is achieved.

Using a near infrared camera (with e.g. InGaAs sensors) or an infrared/thermal camera in combination with suitable mirrors (e.g. silver coated mirrors will work properly here also), will give spectrometers covering other parts of the electromagnetic spectrum—in this case covering the mid and far infrared spectral regions and the infrared spectral region, respectively. By the same way, using an ultrasound sensors matrix, in combination with ultrasound reflecting mirrors, will make it possible to generate interference patterns of ultrasound signals which can be converted into spectra using Fourier Transform. The same system design applies for other parts of the electromagnetic spectrum, such as those covering X-ray, Microwave and Radio Frequency (RF) signals.

It is also possible "zoom in" a specific portion of the spectral range which is detectable by a certain system. This can be done by optimizing the dimensions of the system—by choosing optimizing the size/dimensions of the parallel cylindrical mirrors, the distance between the mirrors and the imaging sensor, as well as the resolution of the imaging sensor.

By using modified designs utilizing this new technique, it is possible to build spot spectrometers, line-scan hyperspectral cameras (scan the scene and capture the image line by line) as well as staring hyperspectral cameras that capture instantaneous 2D images. A line imaging sensor is enough for building a spot spectrometer, while a matrix imaging sensor is required for the line-scan and the 2D-instantaneous hyperspectral cameras.

Modified variants of said reflective Young's interferometer can be used to analyze wave signals transmitted or reflected by an object of interest, by interfering said wave signals with reference wave signals.

According to one aspect of the present invention, there is provided a Holographic Fourier Transform Imaging Spectrometer, HFTIS, comprising: a wave-signal collecting unit for delivering collimated wave signals (1 or 11); a pair of parallel cylindrical mirrors (23 or 24) for generating an interference pattern from the wave signals; an imaging sensor (41 or 42) for capturing the interference pattern; and a computation unit for performing digital correction of the captured interference pattern, to straighten the captured interference pattern and thereby provide correct spectra after Fourier Transformation.

According to a sub-aspect of the present invention, there is provided a Holographic Fourier Transform Imaging Spectrometer, HFTIS, comprising: a wave-signal collecting unit for delivering collimated wave signals (12); a number of parallel cylindrical mirrors (25) for generating partially overlapping interference patterns; an imaging sensor (42) for capturing the interference patterns; and a computation unit for performing either extraction/estimation of each interference pattern, or extraction/estimation of the spectrum of each interference pattern, in addition to digital correction to straighten the interference patterns to provide correct spectra after Fourier Transformation.

According to a sub-aspect of the present invention, there is provided a HFTIS, wherein said imaging sensor is either a CMOS or a CCD imaging sensor array, covering the near ultra-violet, visible and/or near infrared spectral ranges, and said wave-signal collecting unit as well as said pair of parallel cylindrical mirrors are optimized for near ultraviolet, visible and/or near infrared (NIR) wave-signals; said sensors can either be of a single-layered or a multi-layered type; and said sensors are of a cooled or a non-cooled type.

According to a sub-aspect of the present invention, there is provided a HFTIS, wherein said imaging sensor is an infrared imaging sensor array, covering the near, short-wave, mid-wave, long-wave and/or very-long wave infrared spectral ranges, and said wave-signal collecting unit as well as said pair of parallel cylindrical mirrors are optimized for near, short-wave, mid-wave, long-wave and/or very-long wave infrared signals, respectively; and said sensors are of a cooled or a non-cooled type.

According to a sub-aspect of the present invention, there is provided a HFTIS, wherein said imaging sensor is an ultra-violet imaging sensor array, and said wave-signal collecting unit as well as said pair of parallel cylindrical mirrors are optimized for ultraviolet wave-signals.

According to a sub-aspect of the present invention, there is provided a HFTIS, wherein said imaging sensor is an ultra-sound imaging sensor array, and said wave-signal collecting unit as well as said pair of parallel cylindrical mirrors are optimized for ultrasound wave-signals.

According to a sub-aspect of the present invention, there is provided a HFTIS, wherein said imaging sensor is a X-ray imaging sensor array, and said wave-signal collecting unit as well as said pair of parallel cylindrical mirrors are optimized for X-ray wave-signals.

According to a sub-aspect of the present invention, there is provided a HFTIS, wherein said imaging sensor is a radio-frequency or a microwave sensor array, and said wave-signal collecting unit as well as said pair of parallel cylindrical mirrors are optimized for radio-frequency or microwave wave-signals, respectively.

According to a sub-aspect of the present invention, there is provided a HFTIS, wherein said wave-signal collecting unit comprises a pair of a concave mirror (866) and a convex mirror (855) which can be either parabolic or spherical mirrors; said concave mirror (866) focuses the wave-signals (10) on said convex mirror (855) which gives parallel/collimated wave-signals (11) which pass through either a pinhole at the centre of said concave mirror (866) or a narrow slit situated in the middle of said concave mirror (866); said parallel/collimated wave-signals (11) hit said pair of parallel cylindrical mirrors which generate interference patterns which are detected by said imaging sensor array which comprises either a matrix of sensor elements or a single line of sensor elements.

According to a sub-aspect of the present invention, there is provided a HFTIS, wherein said wave-signal collecting unit comprises a pair of a cylindrical concave mirror (86) and a cylindrical convex mirror (85), which can be a reflecting needle/rod, where the axes of said pair of mirrors are parallel; said cylindrical concave mirror (86) focuses the wave-signals on said cylindrical convex mirror (85) which gives parallel/collimated wave-signals (11) which pass through a narrow slit in the middle of said cylindrical concave mirror; said narrow slit is parallel to the axis of said cylindrical concave mirror; said parallel/collimated wave-signals hit said pair of parallel cylindrical mirrors which generate interference patterns which are detected by said imaging sensor array which comprises either a matrix of sensor elements (42) or a single line of sensor elements (41); and the axis of said pair of parallel cylindrical mirrors are parallel to said narrow slit.

According to a sub-aspect of the present invention, there is provided a HFTIS, wherein said wave-signal collecting unit comprises at least one waveguide/optical-fiber, and said imaging sensor array comprises either a matrix of sensor elements or a single line of sensor elements.

According to a sub-aspect of the present invention, there is provided a HFTIS, wherein said wave-signal collecting unit comprises a pair of a first and a second achromatic-doublet/plano-convex/biconvex lenses (811) and a pinhole (911), and said imaging sensor array comprises either a matrix of sensor elements (42) or a single line of sensor elements (41); wherein digital aberration correction is used to compensate for the impact of said lenses' and other refractive components.

According to a sub-aspect of the present invention, there is provided a HFTIS, wherein said wave-signal collecting unit comprises a pair of a first and a second ball lenses (822) and a pinhole (911), and said imaging sensor array comprises either a matrix of sensor elements (42) or a single line of sensor elements (41); wherein digital aberration correction is used to compensate for the impact of said lenses' and other refractive components.

According to a sub-aspect of the present invention, there is provided a HFTIS, wherein said wave-signal collecting unit comprises a pair of a first and a second achromatic-doublet/plano-convex/biconvex lenses (811) and either a reflecting ball (922) or a reflecting needle/rod (92), and said imaging sensor array comprises either a matrix of sensor elements (42) or a single line of sensor elements (41); wherein digital aberration correction is used to compensate for the impact of said lenses' and other refractive components.

According to a sub-aspect of the present invention, there is provided a HFTIS, wherein said wave-signal collecting unit comprises a pair of a first and a second ball lenses (822) and either a reflecting ball (922) or a reflecting needle/rod (92), and said imaging sensor array comprises either a matrix of sensor elements (42) or a single line of sensor elements (41); wherein digital aberration correction is used to compensate for the impact of said lenses' and other refractive components.

According to a sub-aspect of the present invention, there is provided a HFTIS, wherein said wave-signal collecting unit comprises a pair of a first and a second cylindrical achromatic-doublet/plano-convex/biconvex lenses (81) and a narrow slit (91), and said imaging sensor array comprises a matrix of sensor elements (42); the axis of said pair of parallel cylindrical mirrors (24) is parallel to said narrow slit (91); wherein digital aberration correction is used to compensate for the impact of said lenses' and other refractive components.

According to a sub-aspect of the present invention, there is provided a HFTIS, wherein said wave-signal collecting unit comprises a pair of a first and a second rod lenses (82) and a narrow slit (91), and said imaging sensor array comprises a matrix of sensor elements (42); the axis of said pair of parallel cylindrical mirrors (24) is parallel to said narrow slit (91); wherein digital aberration correction is used to compensate for the impact of said lenses' and other refractive components.

According to a sub-aspect of the present invention, there is provided a HFTIS, wherein said wave-signal collecting unit comprises a pair of a first and a second cylindrical achromatic-doublet/plano-convex/biconvex lenses (81) and a reflecting needle/rod (92), and said imaging sensor array comprises a matrix of sensor elements (42); the axis of said pair of parallel cylindrical mirrors (24) is parallel to the axis of said reflecting needle/rod (92); wherein digital aberration correction is used to compensate for the impact of said lenses' and other refractive components.

According to a sub-aspect of the present invention, there is provided a HFTIS, wherein said wave-signal collecting unit comprises a pair of a first and a second rod lenses (82) and a reflecting needle/rod (92), and said imaging sensor array comprises a matrix of sensor elements (42); the axis of said pair of parallel cylindrical mirrors (24) is parallel to the axis of said reflecting needle/rod (92); wherein digital aberration correction is used to compensate for the impact of said lenses' and other refractive components.

According to a sub-aspect of the present invention, there is provided a HFTIS, wherein at least one waveguide/optical-fiber (61 or 62) is used to deliver wave-signals (10) to said wave-signal collecting unit described previously; the resulting construction is a multi-input HFTIS which can simultaneously measure a number of wave-signals.

According to a sub-aspect of the present invention, there is provided a HFTIS, wherein said imaging sensor (42) is either a CMOS or a CCD imaging sensor array, covering the near ultraviolet, visible and/or near infrared spectral ranges, and said wave-signal collecting unit as well as said parallel cylindrical mirrors (25) are optimized for near ultraviolet, visible and/or near infrared (NIR) wave-signals; said sensors can either be of a single-layered or a multi-layered type; and said sensors are of a cooled or a non-cooled type.

According to a sub-aspect of the present invention, there is provided a HFTIS, wherein said imaging sensor (42) is an infrared imaging sensor array, covering the near, short-wave, mid-wave, long-wave and/or very-long wave infrared spectral ranges, and said wave-signal collecting unit as well as said parallel cylindrical mirrors (25) are optimized for near, short-wave, mid-wave, long-wave and/or very-long wave infrared signals, respectively; and said sensors are of a cooled or a non-cooled type.

According to a sub-aspect of the present invention, there is provided a HFTIS, wherein said imaging sensor (42) is an ultraviolet imaging sensor array, and said wave-signal collecting unit as well as said pair of parallel cylindrical mirrors (25) are optimized for ultraviolet wave-signals.

According to a sub-aspect of the present invention, there is provided a HFTIS, wherein said imaging sensor (42) is an ultrasound imaging sensor array, and said wave-signal collecting unit as well as said parallel cylindrical mirrors (25) are optimized for ultrasound wave-signals.

According to a sub-aspect of the present invention, there is provided a HFTIS, wherein said imaging sensor (42) is a X-ray imaging sensor array, and said wave-signal collecting unit as well as said parallel cylindrical mirrors (25) are optimized for X-ray wave-signals.

According to a sub-aspect of the present invention, there is provided a HFTIS, wherein said imaging sensor (42) is a radio-frequency or a microwave sensor array, and said wave-signal collecting unit as well as said parallel cylindrical mirrors (25) are optimized for radio-frequency or microwave wave-signals, respectively.

According to a sub-aspect of the present invention, there is provided a HFTIS, wherein said wave-signal collecting unit comprises a pair of a concave mirror (866) and a convex mirror (855) which is either parabolic or spherical mirrors; said concave mirror (866) focuses the wave-signals on said convex mirror (855) which give parallel/collimated wave-signals which pass through a hole at the centre of said concave mirror (866); said parallel/collimated wave-signals (11) hit said parallel cylindrical mirrors (25) which generate interference patterns which are detected by said imaging sensor array which comprises a matrix of sensor elements (42).

According to a sub-aspect of the present invention, there is provided a HFTIS, wherein said wave-signal collecting unit comprises a pair of a first and a second achromatic-doublet/plano-convex/biconvex lenses (811) and a hole (911), and said imaging sensor array comprises a matrix of sensor elements (42); wherein digital aberration correction is used to compensate for the impact of said lenses' and other refractive components.

According to a sub-aspect of the present invention, there is provided a HFTIS, wherein said wave-signal collecting unit comprises a pair of a first and a second achromatic-doublet/plano-convex/biconvex lenses (811) and a reflecting ball (922), and said imaging sensor array comprises a matrix of sensor elements (42); wherein digital aberration correction is used to compensate for the impact of said lenses' and other refractive components.

According to a sub-aspect of the present invention, there is provided a HFTIS, wherein a certain spectral region can be zoomed in/out by optimizing and changing the distance between said parallel cylindrical mirrors, and/or by optimizing and changing the distance between said imaging sensor array and said parallel cylindrical mirrors which generate the interference patterns and keeping the same angle between the planes containing them; the interference patterns are magnified because they are fan-shaped and spread out from said parallel cylindrical mirrors towards said imaging sensor array; the magnification factor can also be changed by changing the convexity of said parallel cylindrical mirrors by using deformable mirrors; said magnification factor is larger or smaller than one.

According to a sub-aspect of the present invention, there is provided a HFTIS, wherein a certain spectral region can be zoomed in/out by optimizing and changing the distance between said parallel cylindrical mirrors, and/or by optimizing and rotating said imaging sensor array and/or said parallel cylindrical mirrors with respect to each other, in addition to translating one or both of them properly to optimize and change the distance between them, to be able to capture the magnified interference patterns; the interference patterns are magnified because they are fan-shaped and spread out from said parallel cylindrical mirrors towards said imaging sensor array; the magnification factor can also be changed by changing the convexity of said parallel cylindrical mirrors by using deformable mirrors; said magnification factor is larger or smaller than one.

According to a sub-aspect of the present invention, there is provided a HFTIS, wherein said first lens, in said wave-signal collecting unit, is translated by small steps with respect to said narrow slit, said pinhole, said reflecting ball, said reflecting rod or said reflecting needle, respectively, so that said narrow slit, said pinhole, said reflecting ball, said reflecting rod or said reflecting needle will still be positioned at the focal plane of said first lens, but will at each time for every said small step be located at a new position to let a new line of the imaged scene to pass through the wave-signal collecting unit, and hit said pair of parallel cylindrical mirrors and generate interference patterns; the generated interference patterns are captured after each said small-step movement, and converted into spectra with Fourier Transform after digital correction to straighten the interference patterns; the result is a line-scanning HFTIS which can capture two-dimensional hyperspectral images.

According to a sub-aspect of the present invention, there is provided a HFTIS, wherein said imaging sensor array comprises a single line of sensor elements (41) instead of a matrix of sensor elements (42), and is translated by small steps along a perpendicular axis to the axis of said line of sensor elements (41) so that said translation occurs within the plane built by said perpendicular axes which is the same plane built by the surfaces of said sensor elements (41), so that incoming parallel light passing through said narrow slit, said pinhole, said reflecting ball, said reflecting rod or said reflecting needle, respectively, and reflected by said pair of parallel cylindrical mirrors to generate interference patterns, which are captured by said line of sensor elements (41) after each said small-step movement, and converted into spectra with Fourier Transform after digital correction to straighten the interference patterns, resulting in a scanning HFTIS which can capture a one-dimensional hyperspectral row/column; and, in the case where the scanning results in varying distance between the axis of said line of sensor elements and the region of said parallel cylindrical mirrors from where said interference patterns are generated and detected by said line of sensor elements (41), a zooming in/out of certain spectral regions is obtained, if the incoming parallel wave-signals along said parallel cylindrical mirrors have the same spectral content.

According to a sub-aspect of the present invention, there is provided a HFTIS, wherein said pair of a concave mirror (866) and a convex mirror (855, which delivers parallel/collimated wave signals) is translated with small steps so that said pair of parallel cylindrical mirrors will at each time for every said small step be located at a new position to generate interference patterns for a new line or a new point of the imaged scene; wherein the generated interference patterns are captured after each said small-step movement, and converted into spectra with Fourier Transform after digital correction to straighten the interference patterns, resulting in a line-scanning, respectively, a pixel-scanning HFTIS which is for capturing two-dimensional hyperspectral images.

According to a sub-aspect of the present invention, there is provided a HFTIS, wherein said pair of a concave mirror (866) and a convex mirror (855) delivers parallel/collimated wave signals to a plane mirror (87), which reflects said parallel/collimated wave signals (11) at 45-degrees angle and delivers them (111) to said pair of parallel cylindrical mirrors (24); said plane mirror (87) is translated with small steps so that said pair of parallel cylindrical mirrors (24) will at each time for every said small step be located at the same place and receive said parallel/collimated wave signals (111) representing a new line of the imaged scene; the generated interference patterns are captured by an imaging sensor (42) after each said small-step movement, and converted into spectra with Fourier Transform after digital correction to straighten the interference patterns, resulting in a line-scanning HFTIS which can capture two-dimensional hyperspectral images.

According to a sub-aspect of the present invention, there is provided a HFTIS, wherein said pair of a concave mirror (866) and a convex mirror (855) delivers parallel/collimated wave signals (11) to a plane mirror (87), which reflects said parallel/collimated wave signals (11) at 45-degrees angle and delivers them (111) to said pair of parallel cylindrical mirrors (23 or 24); said plane mirror (87) is translated with small steps so that said pair of parallel cylindrical mirrors (23 or 24) will at each time for every said small step be located at the same place and receive said parallel/collimated wave signals (111) representing either a new point or a new line, respectively, of the imaged scene; the generated interference patterns are captured by an imaging sensor (41 or 42, respectively) after each said small-step movement, and converted into spectra with Fourier Transform after digital correction to straighten the interference patterns, resulting in a pixel-scanning, respectively a line-scanning HFTIS which is for capturing either a one-dimensional hyperspectral line/row/column or a two-dimensional hyperspectral images, respectively.

According to a sub-aspect of the present invention, there is provided a HFTIS, wherein said pair of a concave mirror (866) and a convex mirror (855) delivers parallel/collimated wave signals (11) to a plane mirror (87), which reflects said parallel/collimated wave signals (11) at 45-degrees angle and delivers them (111) to said pair of parallel cylindrical mirrors (23); said pair of a concave mirror (866) and a convex mirror (855, which delivers parallel/collimated wave signals) is translated with small steps so that said pair of parallel cylindrical mirrors (23) will at each time for every said small step be located properly to receive said parallel/collimated wave signals representing a new point of the imaged scene; the generated interference patterns are captured by an imaging sensor (41) after each said small-step movement, and converted into spectra with Fourier Transform after digital correction to straighten the interference patterns, resulting in a pixel-scanning HFTIS which is for capturing two-dimensional hyperspectral images since two-dimensional scanning (e.g. row-wise or column-wise) is performed.

According to a sub-aspect of the present invention, there is provided a HFTIS, wherein said pair of a cylindrical concave mirror (86) and a cylindrical convex mirror (85) delivers parallel/collimated wave signals (11) to a plane mirror (87), which reflects said parallel/collimated wave signals at 45-degrees angle and delivers them (111) to said pair of parallel cylindrical mirrors (24); said plane mirror (87) is translated with small steps so that said pair of parallel cylindrical mirrors (87) will at each time for every said small step be located at the same place and receive said parallel/collimated wave signals (111) representing a new line of the imaged scene; the generated interference patterns are captured by an imaging sensor (42) after each said small-step movement, and converted into spectra with Fourier Transform after digital correction to straighten the interference patterns, resulting in a line-scanning HFTIS which is for capturing two-dimensional hyperspectral images.

According to a sub-aspect of the present invention, there is provided a HFTIS, wherein said pair of a cylindrical concave mirror (86) and a cylindrical convex mirror (85) delivers parallel/collimated wave signals (11) to a plane mirror (87), which reflects said parallel/collimated wave signals (11) at 45-degrees angle and delivers them (111) to said pair of parallel cylindrical mirrors (23); said plane mirror is translated with small steps so that said pair of parallel cylindrical mirrors (23) will at each time for every said small step be located at the same place and receive said parallel/collimated wave signals (111) representing a new point of the imaged scene; the generated interference patterns are captured by an imaging sensor (41) after each said small-step movement, and converted into spectra with Fourier Transform after digital correction to straighten the interference patterns, resulting in a pixel-scanning HFTIS which is for capturing a one-dimensional hyperspectral line/row/column.

According to a sub-aspect of the present invention, there is provided a HFTIS, wherein said pair of a cylindrical concave mirror (86) and a cylindrical convex mirror (85) delivers parallel/collimated wave signals (11) to a plane mirror (87), which reflects said parallel/collimated wave signals (11) at 45-degrees angle and delivers them (111) to said pair of parallel cylindrical mirrors (23); said pair of a cylindrical concave mirror (86) and a cylindrical convex mirror (85, which delivers parallel/collimated wave signals 11) is translated with small steps so that said pair of parallel cylindrical mirrors (23) will at each time for every said small step be located properly to receive said parallel/collimated wave signals (111) representing a new point of the imaged scene; the generated interference patterns are captured after each said small-step movement, and converted into spectra with Fourier Transform after digital correction to straighten the interference patterns, resulting in a pixel-scanning HFTIS which is for capturing two-dimensional hyperspectral images since two-dimensional scanning (e.g. row-wise or column-wise) is performed.

According to a sub-aspect of the present invention, there is provided a HFTIS, wherein one or both of said pair of parallel cylindrical mirrors are replaced by plane mirrors.

According to a sub-aspect of the present invention, there is provided an all-reflective interferometer, wherein a pair (26) of a plane mirror and a convex mirror are used to split incoming wave signals (1 or 11) (e.g. light signals) into two parts, one of them (15, which is reflected by said plane mirror) is reflected by the object/sample of interest obj to produce wave-signals (16) which interfere with the other (reference/unchanged) part (14) which is reflected by said convex mirror; a cylindrical convex mirror can be used instead of using said convex mirror, and in this case, said plane mirror and said cylindrical convex mirror must have parallel axes in addition to being of the same length.

According to a sub-aspect of the present invention, there is provided an all-reflective interferometer, wherein said convex-mirror/cylindrical-convex-mirror is replaced by a plane mirror, and the resulting pair (27) of plane mirrors is used to split incoming wave signals (1 or 11, e.g. light signals) into two parts, one of them (15) is reflected by the object/sample of interest obj to produce wave-signals (16) which interfere with the other (reference/unchanged) part (14).

According to a sub-aspect of the present invention, there is provided an all-reflective interferometer, wherein a pair (26) of a plane mirror and a convex mirror are used to split incoming wave signals (1 or 11, e.g. light signals) into two parts, one of them (15, which is reflected by said plane mirror) will first pass through the object/sample of interest obj, to produce wave-signal (17) then will be reflected by a plane mirror (88) to produce wave-signals (18) which interfere with the other (reference/unchanged) part (14) which is reflected by said convex mirror; a cylindrical convex mirror can be used instead of using said convex mirror, and in this case, said plane mirror and said cylindrical convex mirror must have parallel axes in addition to being of the same length.

According to a sub-aspect of the present invention, there is provided an all-reflective interferometer, wherein said convex-mirror/cylindrical-convex-mirror is replaced by a plane mirror, wherein the resulting pair (27) of plane mirrors is used to split incoming wave signals (1 or 11, e.g. light signals) into two parts, one of them (15) will first pass through the object/sample of interest obj, then will be reflected by a plane mirror (88) to interfere with the other (reference/unchanged) part (14).

According to a sub-aspect of the present invention, there is provided an all-reflective interferometer, wherein a reflective grid comprising lattice elements (28) is used instead of using said plane mirrors; in said lattice elements (28), the elements have the same structure as said pair (27) of plane mirrors to split incoming wave signals (12, e.g. light signals) into two parts, overlapping interference patterns are generated when said two parts of wave signals meet each others, and a matrix of imaging sensors (42) can be used to capture said interference patterns.

According to a sub-aspect of the present invention, there is provided an all-reflective interferometer, wherein a reflective grid comprising lattice elements (28) is used instead of using said plane mirrors, in said lattice elements (28), the elements have the same structure as said pair (27) of plane mirrors to split incoming wave signals (12, e.g. light signals) into two parts; overlapping interference patterns are generated when said two parts of wave signals meet each others, and a matrix of imaging sensors (42) can be used to capture said interference patterns.

According to a further aspect of the present invention, there is provided a method for separation of partially-overlapping interference patterns, generated by a reflective grid (25) comprising a number of parallel cylindrical convex mirrors, to be able to make a camera that is for capturing instantaneous 2D hyperspectral images; partial sums of partially-overlapping interference patterns are used to be able to extract and estimate the spectra of said interference patterns as follows: identify and extract, then transform each of said partial sums to Fourier domain and finally solve a system of linear equations to estimate the spectra of said interference patterns.

According to a sub-aspect of the present invention, there is provided a HFTIS, said cylindrical convex mirrors have been replaced by cylindrical concave mirrors, and/or wherein said convex mirrors have been replaced by concave mirrors.

According to a sub-aspect of the present invention, there is provided a HFTIS, wherein no digital correction is applied to any said interference pattern.

According to a sub-aspect of the present invention, there is provided a HFTIS, wherein a certain spectral region can be zoomed in/out by optimizing and changing the size/dimensions of said parallel cylindrical mirrors; wherein changing the size or dimensions of the parallel cylindrical mirrors makes it possible to zoom in/out a certain part of the electromagnetic spectrum, respectively.

According to a sub-aspect of the present invention, there is provided a HFTIS, wherein said pair of parallel cylindrical mirrors (23) is replaced by a pair of convex mirrors (231) that are not cylindrical.

According to a sub-aspect of the present invention, there is provided a HFTIS, wherein said pair of parallel cylindrical mirrors (23) is replaced by either a pair of cylindrical mirrors with varying dimensions (241) or a pair of curved cylindrical mirrors with varying dimensions (2411) to be able to add to the said HFTIS a functionality of zooming in/out a certain spectral region; wherein zooming in/out a certain spectral region can be performed by translating 241 or rotating 2411, respectively, so that said parallel/collimated wave signals (1) are reflected by a certain part of 241 or 2411 providing a certain spectral resolution.

According to a sub-aspect of the present invention, there is provided a HFTIS, wherein said pair of parallel cylindrical mirrors (24) is replaced by a pair of cylindrical mirrors with varying dimensions (241) to compensate for the varying distance between said 241 and said imaging sensor (42), wherein the dimensions of the said cylindrical mirrors are slightly reduced when the said distance is slightly increased.

According to a sub-aspect of the present invention, there is provided a HFTIS, wherein said parallel cylindrical mirrors (25) are replaced by a matrix of convex mirrors (251).

According to a sub-aspect of the present invention, there is provided a HFTIS, wherein said cylindrical convex mirrors is replaced by cylindrical concave mirrors, and/or said convex mirrors are replaced by concave mirrors.

According to a sub-aspect of the present invention, there is provided a HFTIS, wherein no said digital correction is applied to any interference pattern.

BRIEF DESCRIPTION OF DRAWINGS

The foregoing, and additional objects, features and advantages of the present invention will be apparent to those of skill in the art from the following description of preferred embodiments thereof, taken with the accompanying drawings, in which:

FIG. 3a is another version of the spot spectrometer in FIG. 2a, wherein a wave guide 61 (e.g. an optical fiber) is used to deliver the parallel/collimated wave signals 1 (e.g. light) to the pair of parallel cylindrical convex mirrors 23. The rest of the construction is exactly the same as in FIG. 2a.

FIG. 3b is another version of the spot spectrometer in FIG. 2b, wherein a wave guide 61 (e.g. an optical fiber) is used to deliver the parallel/collimated wave signals 1 (e.g. light) to the pair of parallel cylindrical convex mirrors 23. The rest of the construction is exactly the same as in FIG. 2b.

FIG. 3c is another version of the spot spectrometer in FIG. 2c, wherein a wave guide 61 (e.g. an optical fiber) is used to deliver the parallel/collimated wave signals 1 (e.g. light) to the pair of parallel cylindrical convex mirrors 23. The rest of the construction is exactly the same as in FIG. 2c.

FIG. 5a is another version of the line-scan hyperspectral camera in FIG. 4a, wherein a number of wave guides 62 (e.g. optical fibers) are used to deliver the wave signals 11 to the pair of parallel cylindrical convex mirrors 24. The rest of the construction is exactly the same as in FIG. 4a.

FIG. 5b is another version of the line-scan hyperspectral camera in FIG. 4b, wherein a number of wave guides 62 (e.g. optical fibers) are used to deliver the wave signals 11 to the pair of parallel cylindrical convex mirrors 24. The rest of the construction is exactly the same as in FIG. 4b.

FIG. 5c is another version of the line-scan hyperspectral camera in FIG. 4c, wherein a number of wave guides 62 (e.g. optical fibers) are used to deliver the wave signals 11 to the pair of parallel cylindrical convex mirrors 24. The rest of the construction is exactly the same as in FIG. 4c.

FIG. 18 shows a matrix of convex mirrors 251 that can be used instead of the parallel cylindrical convex mirrors 25 in the previous figures.

DESCRIPTION OF PREFERRED EMBODIMENTS

The foregoing concepts can be utilized in the following embodiments. For simplification the term light signals is used to refer to the wave signals, which can be visible light, near ultraviolet, ultraviolet, near infrared, infrared, X-rays, ultrasound, microwave or radio signals.

Figure 1:
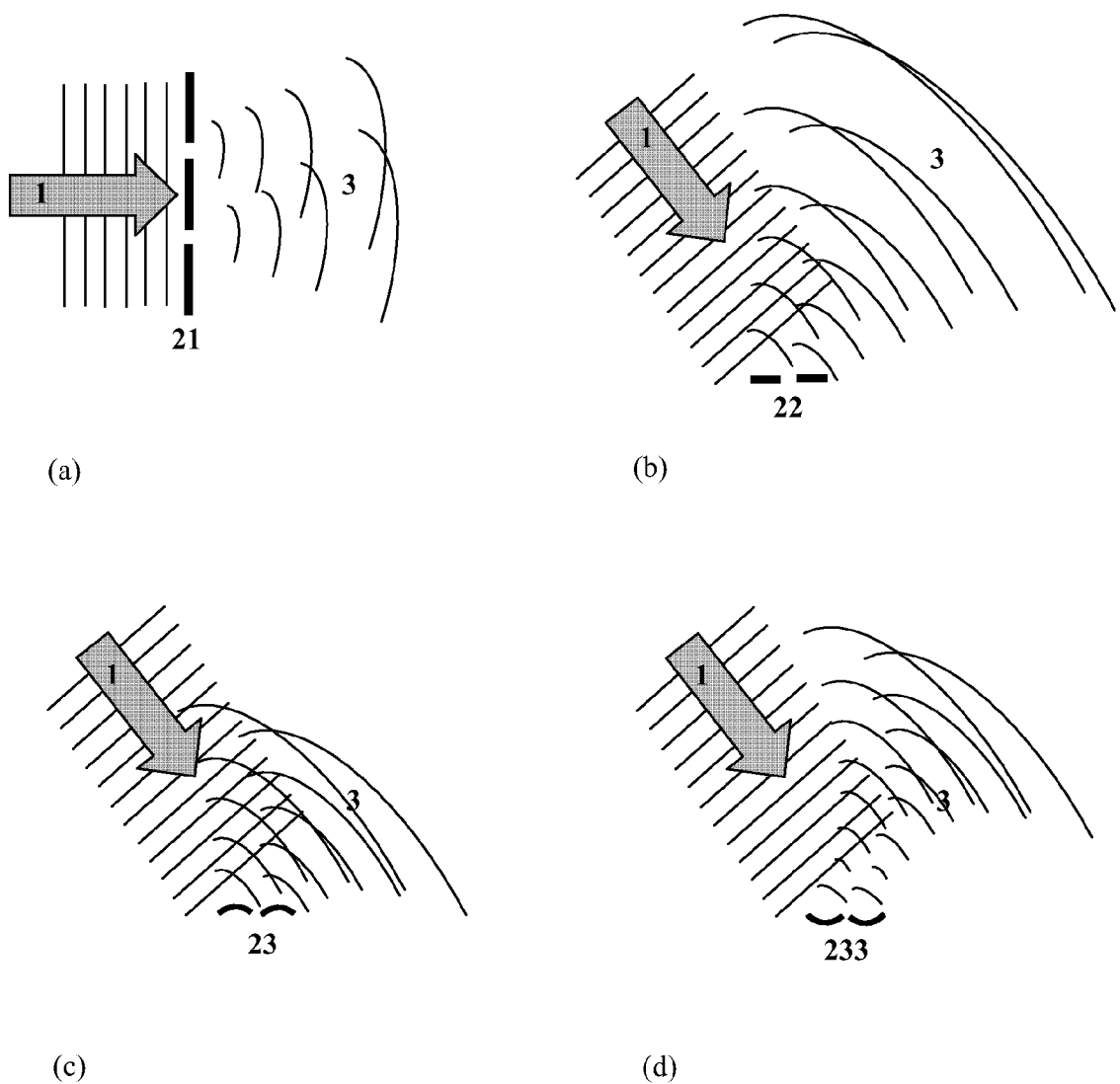
FIG. 1a shows an illustration (a cut section) of the traditional double-slit Young' interferometer. The thick gray arrow and the parallel thin lines represent a planar wave signal 1 which falls on a double slit 21, and the arcs on the other side of said double slit represent the generated two interfering wave signals 3.
FIG. 1b shows an illustration (a cut section) of a modified Young' interferometer, wherein two plane mirrors 22 are used instead of said double slit 21. The thick gray arrow and the parallel thin lines represent a planar wave signal 1 which falls on said plane mirrors 22, and the arcs represent the generated two interfering wave signals 3.
FIG. 1c shows another illustration (a cut section) of a modified Young' interferometer, wherein two convex mirrors 23 are used instead of said double slit 21. The thick gray arrow and the parallel thin lines represent a planar wave signal 1 which falls on said convex mirrors 23, and the arcs represent the generated two interfering wave signals 3.
FIG. 1d shows another illustration (a cut section) of a modified Young' interferometer, wherein two concave mirrors 233 are used instead of said double slit 21. The thick gray arrow and the parallel thin lines represent a planar wave signal 1 which falls on said concave mirrors 233, and the arcs represent the generated two interfering wave signals 3.
Figure 2:
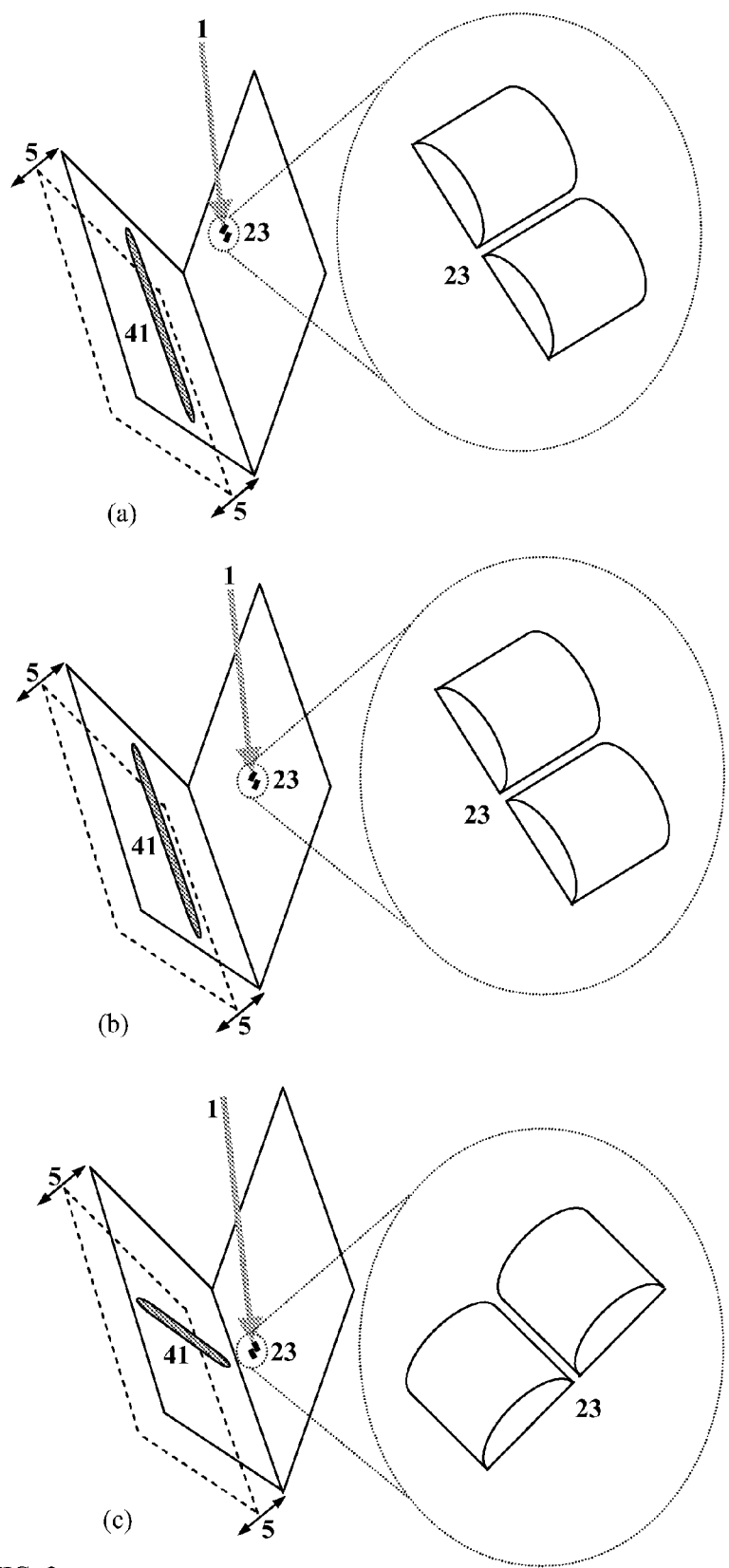
FIG. 2a is a diagrammatic three dimensional illustration of a spot spectrometer. The pair of parallel cylindrical convex mirrors 23 is not centered in the middle but placed in front of the left or right side of the line of imaging sensors 41 to generate a one-sided interference pattern (interferogram) that is captured by said line of imaging sensors 41. An illustration, of said pair of parallel cylindrical convex mirrors 23, is also provided. The two-sided arrows 5 represent the direction of the movement to be able to zoom in/out a certain part of the electromagnetic spectrum. The thick gray arrow represents the parallel/collimated wave signals 1 (e.g. light) to be measured/analyzed.
FIG. 2b is a diagrammatic three dimensional illustration of a spot spectrometer. The pair of parallel cylindrical convex mirrors 23 is centered in the middle in front of the line of imaging sensors 41 to generate a two-sided interference pattern (interferogram) that is captured by said line of imaging sensors 41. An illustration, of said pair of parallel cylindrical convex mirrors 23, is also provided. The two-sided arrows 5 represent the direction of the movement to be able to zoom in/out a certain part of the electromagnetic spectrum. The thick gray arrow represents the parallel/collimated wave signals 1 (e.g. light) to be measured/analyzed.
FIG. 2c is a diagrammatic three dimensional illustration of a spot spectrometer. The pair of parallel cylindrical convex mirrors 23 is not centered in the middle but placed in front of the down side of the line of imaging sensors 41 to generate one sided interference pattern (interferogram) that is captured by said line of imaging sensors 41. An illustration, of said pair of parallel cylindrical convex mirrors 23, is also provided. The two-sided arrows 5 represent the direction of the movement to be able to zoom in/out a certain part of the electromagnetic spectrum. The thick gray arrow represents the parallel/collimated wave signals 1 (e.g. light) to be measured/analyzed.
Figure 3:
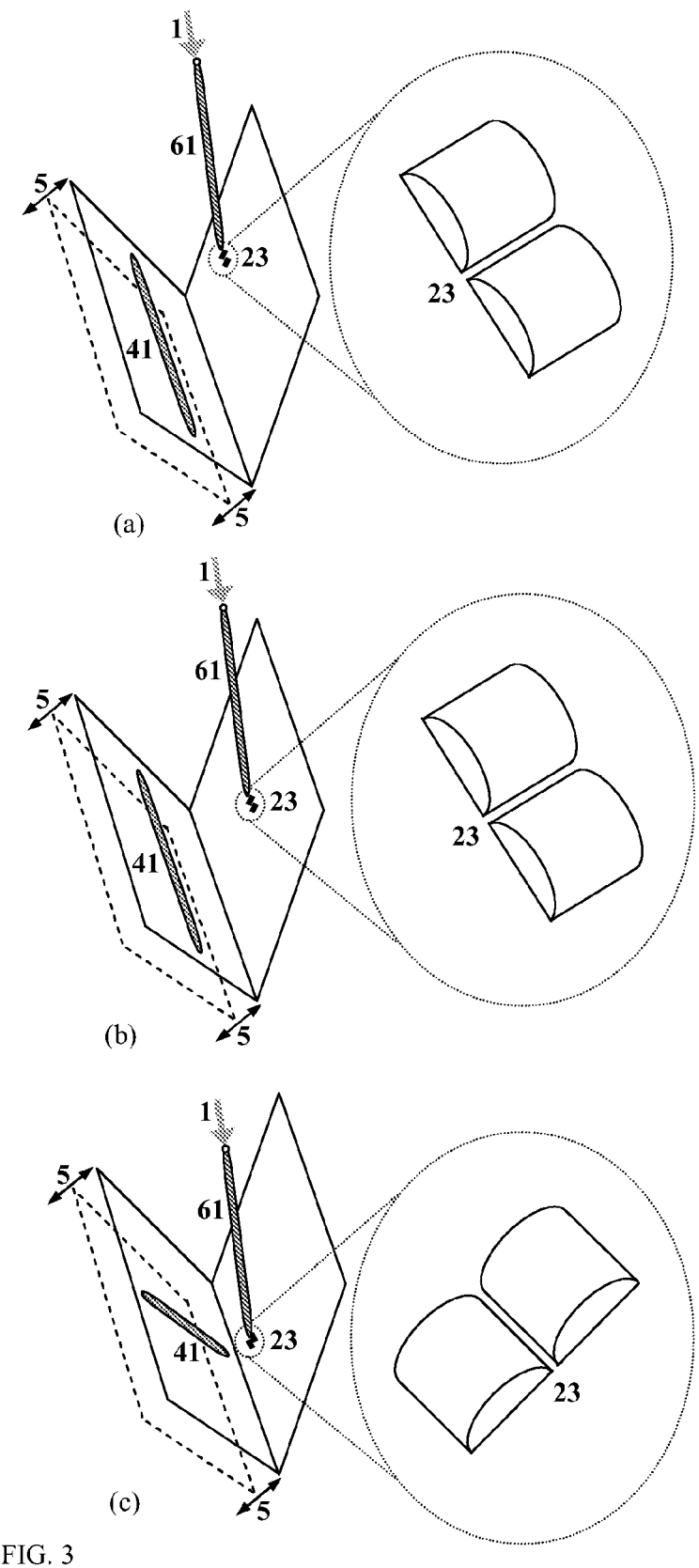

In the first group of embodiments, spot spectrometers can be built according to FIGS. 2 and 3, wherein each of them an imaging sensor 41 (a line of sensor elements) is used to capture the interference patterns generated by two parallel cylindrical convex mirrors 23 reflecting the incoming parallel light signals 1 which can be delivered by a waveguide/optical-fiber 61 and/or an optical system built of lenses and/or mirrors, as described by FIGS. 10-14.

Figure 4:
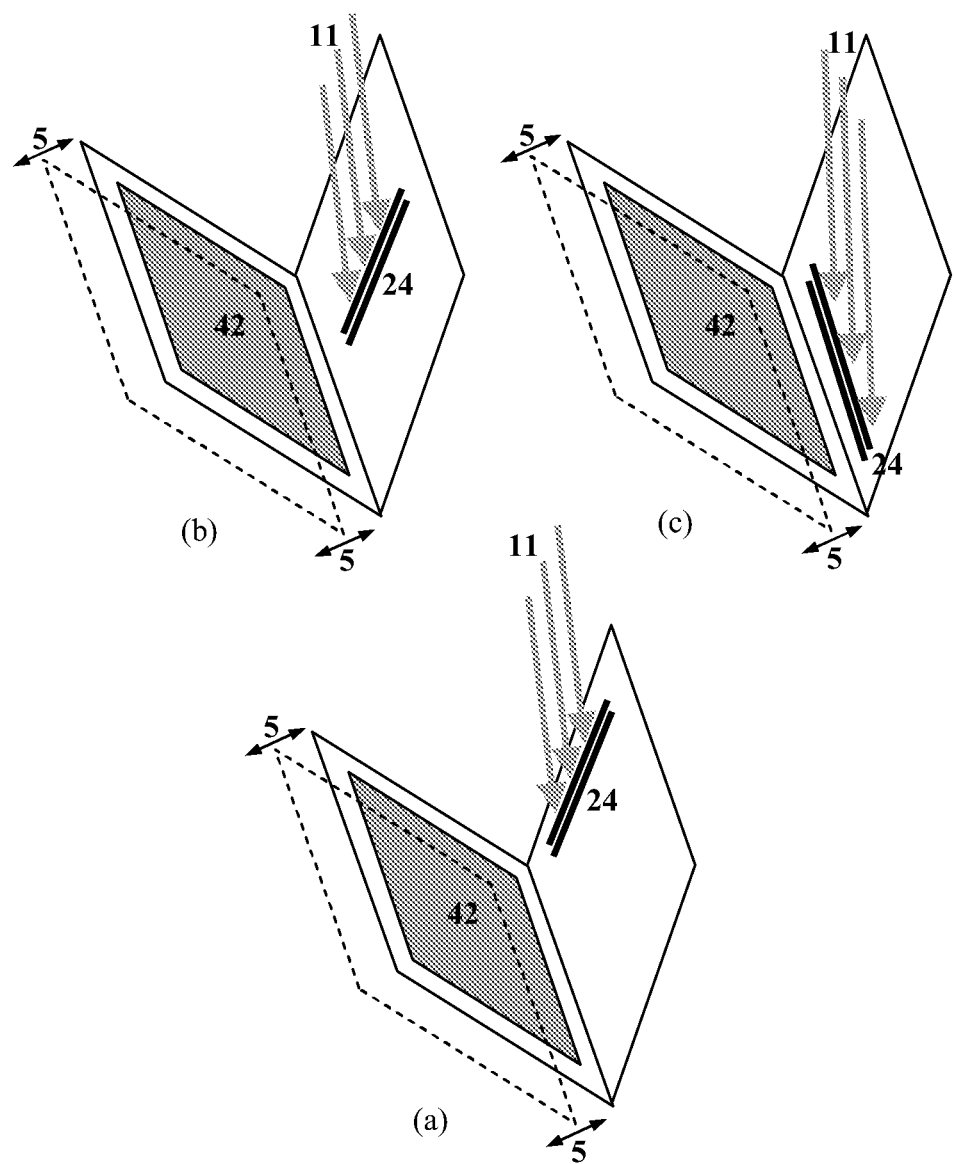
FIG. 4a is a diagrammatic three dimensional illustration of a line-scan hyperspectral camera, wherein the construction is similar to that of FIG. 2a, except using a matrix of imaging sensors 42 and a much longer pair of parallel cylindrical convex mirrors 24.
FIG. 4b is a diagrammatic three dimensional illustration of a line-scan hyperspectral camera, wherein the construction is similar to that of FIG. 2b, except using a matrix of imaging sensors 42 and a much longer pair of parallel cylindrical convex mirrors 24.
FIG. 4c is a diagrammatic three dimensional illustration of a line-scan hyperspectral camera, wherein the construction is similar to that of FIG. 2c, except using a matrix of imaging sensors 42 and a much longer pair of parallel cylindrical convex mirrors 24.
Figure 5:
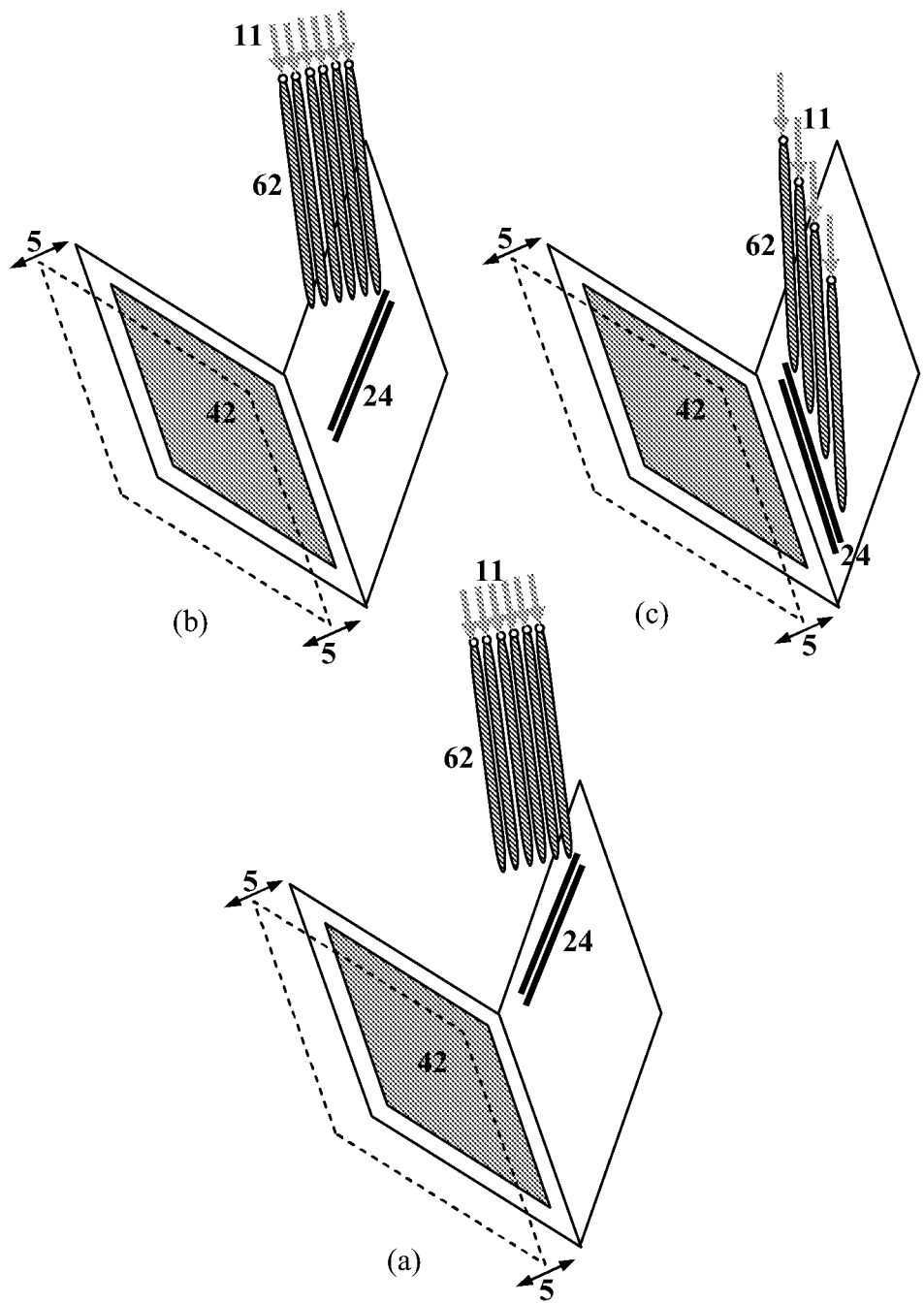

In the second group of embodiments, line-scan hyperspectral cameras can be built according to FIGS. 4 and 5, wherein each of them an imaging sensor 42 (a matrix of sensor elements) is used to capture the interference patterns generated by two parallel cylindrical convex mirrors 24 reflecting the incoming parallel light signals 11 which can be delivered by waveguides/optical-fibers 62 and/or an optical system built of lenses and/or mirrors, as described by FIGS. 8-14.

Figure 6:
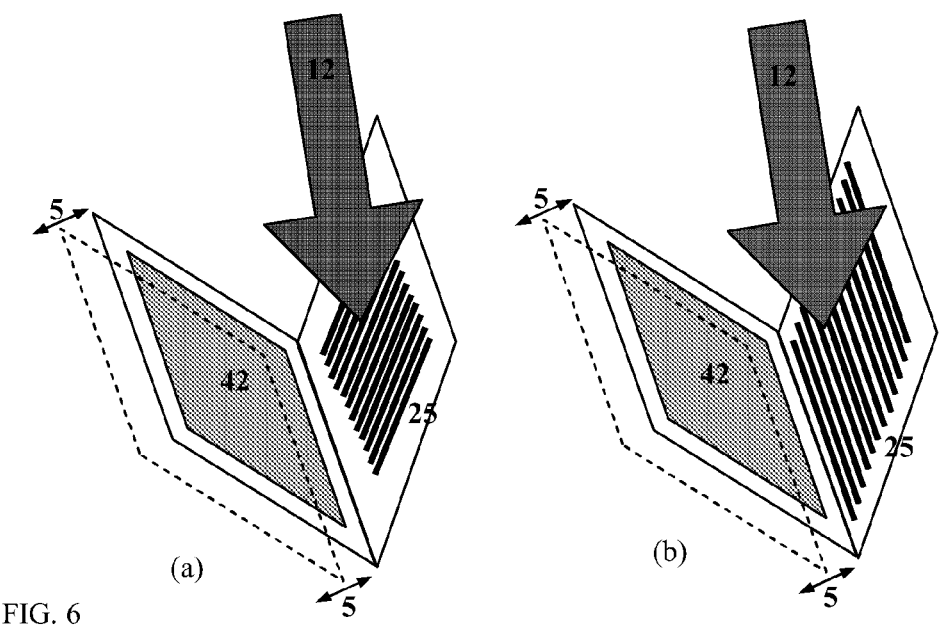
FIGS. 6a and 6b show two diagrammatic three dimensional illustrations of hyperspectral cameras that can capture instantaneous 2D hyperspectral images. The difference between these two camera constructions is the direction of the used parallel cylindrical convex mirrors 25. The two-sided arrows 5 represent the direction of the movement to be able to zoom in/out a certain part of the electromagnetic spectrum. The thick/big gray arrow represents the wave signals 12 to be measured/analyzed.
Figure 7:
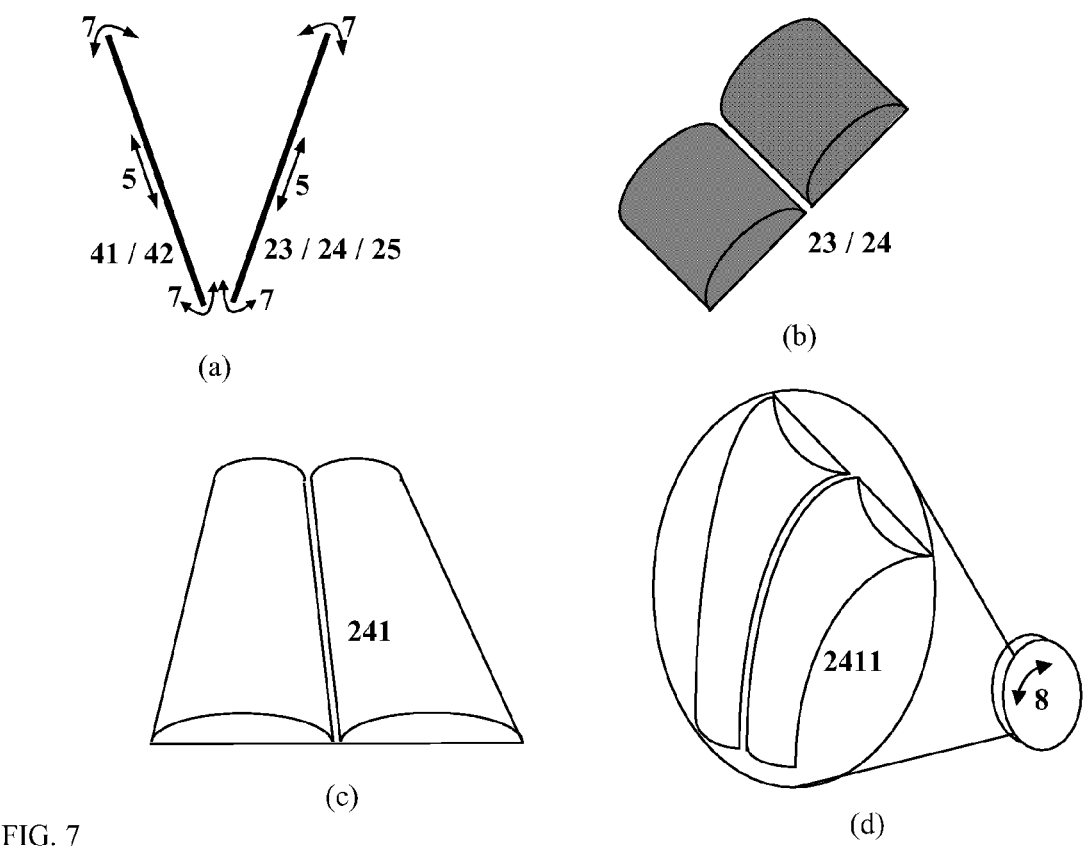
FIG. 7a shows another way to zoom in/out a certain part of the electromagnetic spectrum. A diagrammatic cut section of a system, comprising an imaging sensor (which can be a 41 or a 42) and a pair of parallel cylindrical convex mirrors (which can be a 23, a 24 or a 25), is shown. The two-sided arrows (5 and 7) represent the directions of translating (represented by 5) and rotating (represented by 7) said imaging sensor and said pair of parallel cylindrical convex mirrors, with respect to each other.
FIG. 7b shows another way to zoom in/out a certain part of the electromagnetic spectrum. A diagrammatic three dimensional illustration of a pair of parallel cylindrical convex mirrors (which can be a 23 or a 24), is shown. Increasing/decreasing the size/dimensions of the parallel cylindrical mirrors will make it possible to zoom in/out a certain part of the electromagnetic spectrum, respectively. This method can be applied using a pair of convex mirrors 231 (not cylindrical).
FIG. 7c shows another way to zoom in/out a certain part of the electromagnetic spectrum. A diagrammatic three dimensional illustration of a pair of parallel cylindrical convex mirrors with varying dimensions 241, is shown. By gradually changing (increasing or decreasing) the size/dimensions of the parallel cylindrical mirrors will gradually zoom in or out, respectively, a certain part of the electromagnetic spectrum.
FIG. 7d shows another way to zoom in/out a certain part of the electromagnetic spectrum. It shows a diagrammatic three dimensional illustration of a curved variant 2411 of the pair of parallel cylindrical convex mirrors of varying dimensions shown in FIG. 7c. The two-sided arrow 8 represents the direction of rotating this pair of curved mirrors (which is mounted on a wheel) to be able to zoom in/out a certain part of the electromagnetic spectrum.
Figure 8:
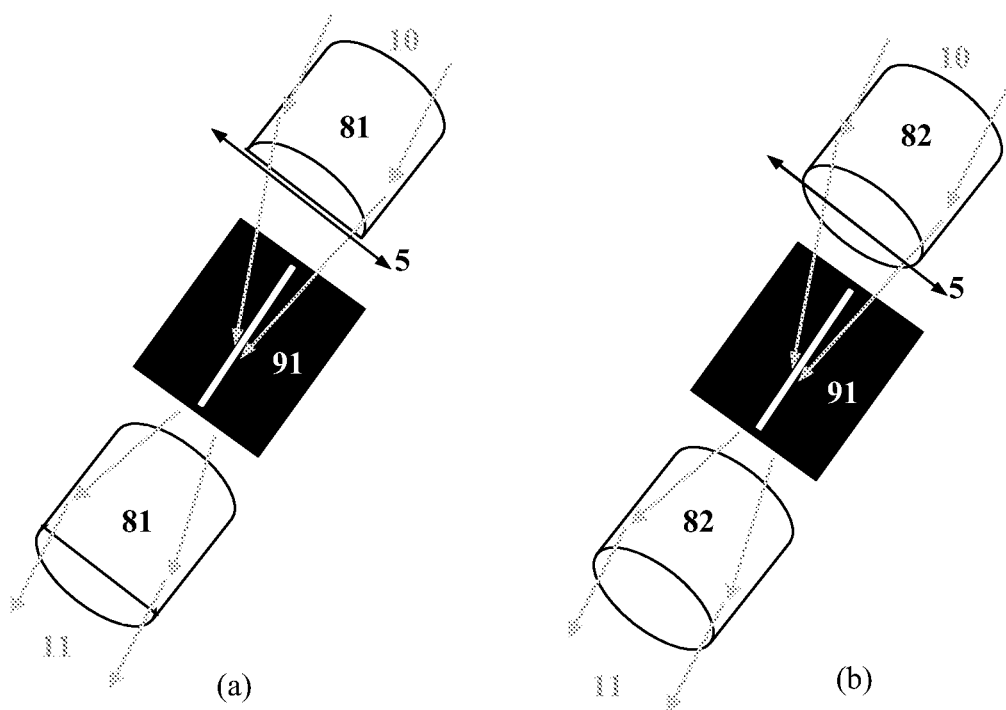
FIG. 8a is a diagrammatic three dimensional illustration of an optical system for delivery of parallel/collimated wave signals 11 (e.g. light), comprising a first and a second cylindrical achromatic-doublet/plano-convex/biconvex lenses 81 and a thin slit 91. The two-sided arrow 5 represents the direction according to which said first cylindrical achromatic-doublet/plano-convex/biconvex lens 81 can be translated slowly and/or with small steps to achieve a scanning system. The thick gray arrows (10 and 11) show how the wave signals are transmitted and propagated through the optical system.
FIG. 8b is a diagrammatic three dimensional illustration of an optical system for delivery of parallel/collimated wave signals 11 (e.g. light), comprising a first and a second rod lenses 82 and a thin slit 91. The two-sided arrow 5 represents the direction according to which said first rod lens 82 can be translated slowly and/or with small steps to achieve a scanning system. The thick gray arrows (10 and 11) show how the wave signals are transmitted and propagated through the optical system.
Figure 9:
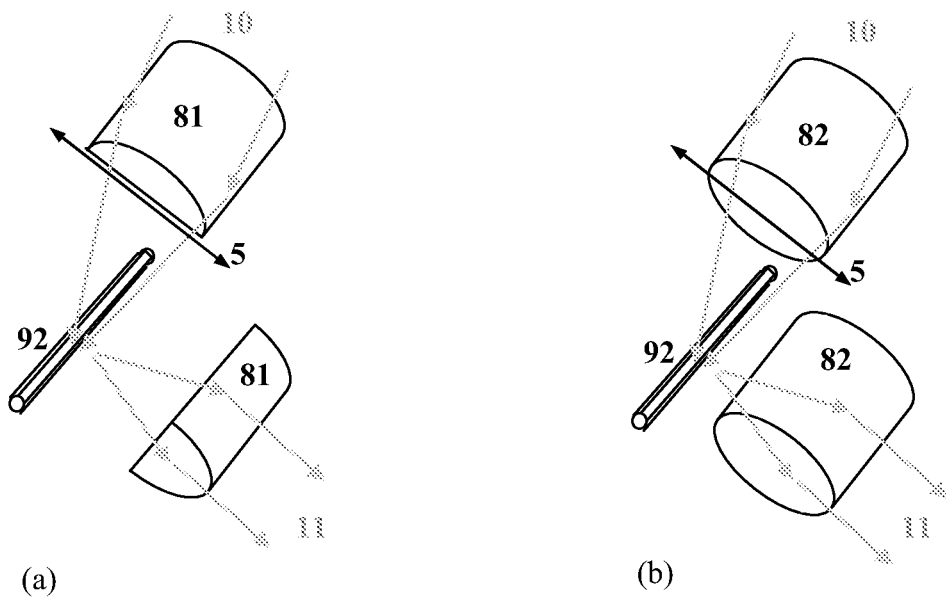
FIG. 9a is a diagrammatic three dimensional illustration of an optical system for delivery of parallel/collimated wave signals 11 (e.g. light), comprising a first and a second cylindrical achromatic-doublet/plano-convex/biconvex lenses 81 and a reflecting needle/rod 92. The two-sided arrow 5 represents the direction according to which said first cylindrical achromatic-doublet/plano-convex/biconvex lens 81 can be translated slowly and/or with small steps to achieve a scanning system. The thick gray arrows (10 and 11) show how the wave signals are transmitted/reflected and propagated through the optical system.
FIG. 9b is a diagrammatic three dimensional illustration of an optical system for delivery of parallel/collimated wave signals 11 (e.g. light), comprising a first and a second rod lenses 82 and a reflecting needle/rod 92. The two-sided arrow 5 represents the direction according to which said first rod lens 82 can be translated slowly and/or with small steps to achieve a scanning system. The thick gray arrows (10 and 11) show how the wave signals are transmitted/reflected and propagated through the optical system.
Figure 10:
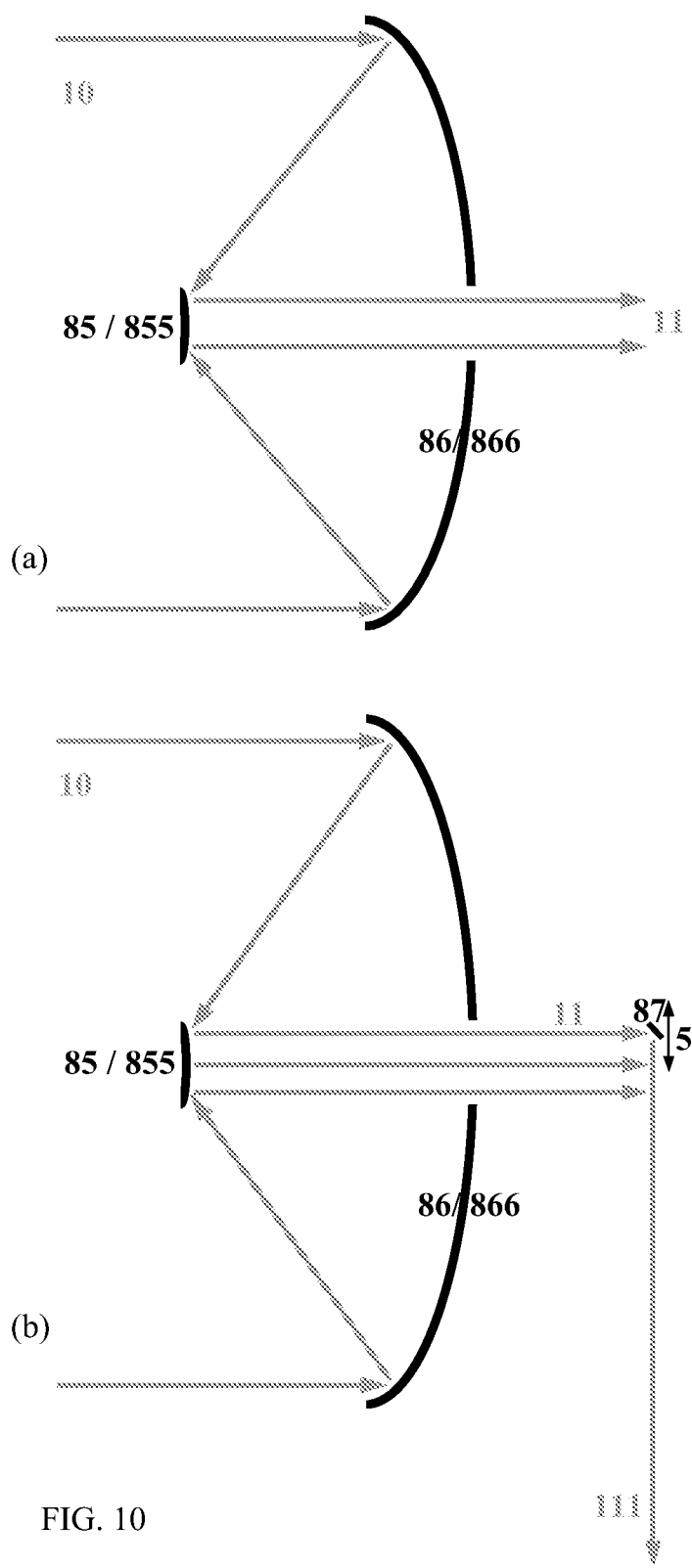
FIG. 10a is a diagrammatic two dimensional illustration (a cut section) of an optical system for delivery of parallel/collimated wave signals 11 (e.g. light), comprising a pair of a concave mirror (denoted by 86 or 866) and a convex mirror (denoted by 85 or 855) which can be either parabolic/spherical (86 and 85) or cylindrical with parallel axes (866 and 855). The thick gray arrows (10 and 11) show how the wave signals are reflected and propagated through the optical system.
FIG. 10*b* shows how to develop the construction in FIG. 10*a* to achieve a scanning system, by adding a relatively small tilted plane mirror 87 that can be translated slowly and/or with small steps, as indicated by the two-sided arrow 5. The thick gray arrows (10, 11 and 111) show how the wave signals are reflected and propagated through the optical system.
Figure 11:
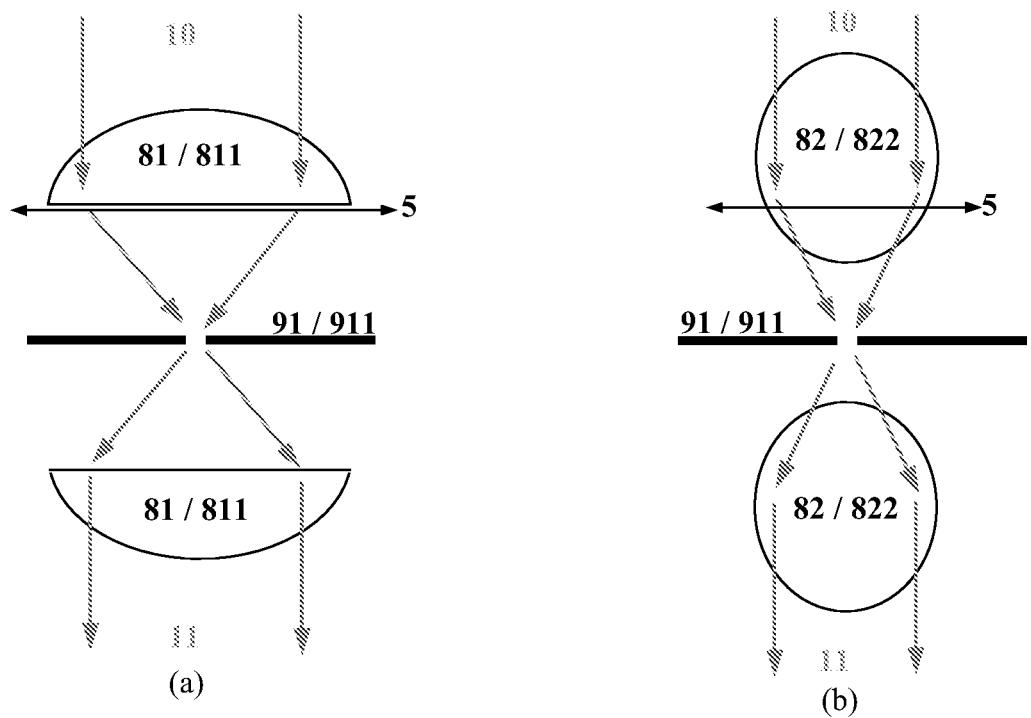
FIG. 11*a* is a diagrammatic two dimensional illustration (a cut section) of an optical system, for delivery of parallel/collimated wave signals 11 (e.g. light), comprising a pair of a first and a second achromatic-doublet/plano-convex/biconvex lenses 811 and a hole/pinhole 911. The two-sided arrow 5 represents the direction according to which said first achromatic-doublet/plano-convex/biconvex lens 811 can be translated slowly and/or with small steps to achieve a scanning system. The thick gray arrows (10 and 11) show how the wave signals are transmitted and propagated through the optical system. This figure also presents a diagrammatic two dimensional illustration (a cut section) of the optical system in FIG. 8*a*.
FIG. 11*b* is a diagrammatic two dimensional illustration (a cut section) of an optical system for delivery of parallel/collimated wave signals 11 (e.g. light), comprising a pair of a first and a second ball lenses 822 and a hole/pinhole 911. The two-sided arrow 5 represents the direction according to which said first ball lens 822 can be translated slowly and/or with small steps to achieve a scanning system. The thick gray arrows (10 and 11) show how the wave signals are transmitted and propagated through the optical system. This figure also presents a diagrammatic two dimensional illustration (a cut section) of the optical system in FIG. 8*b*.
Figure 12:
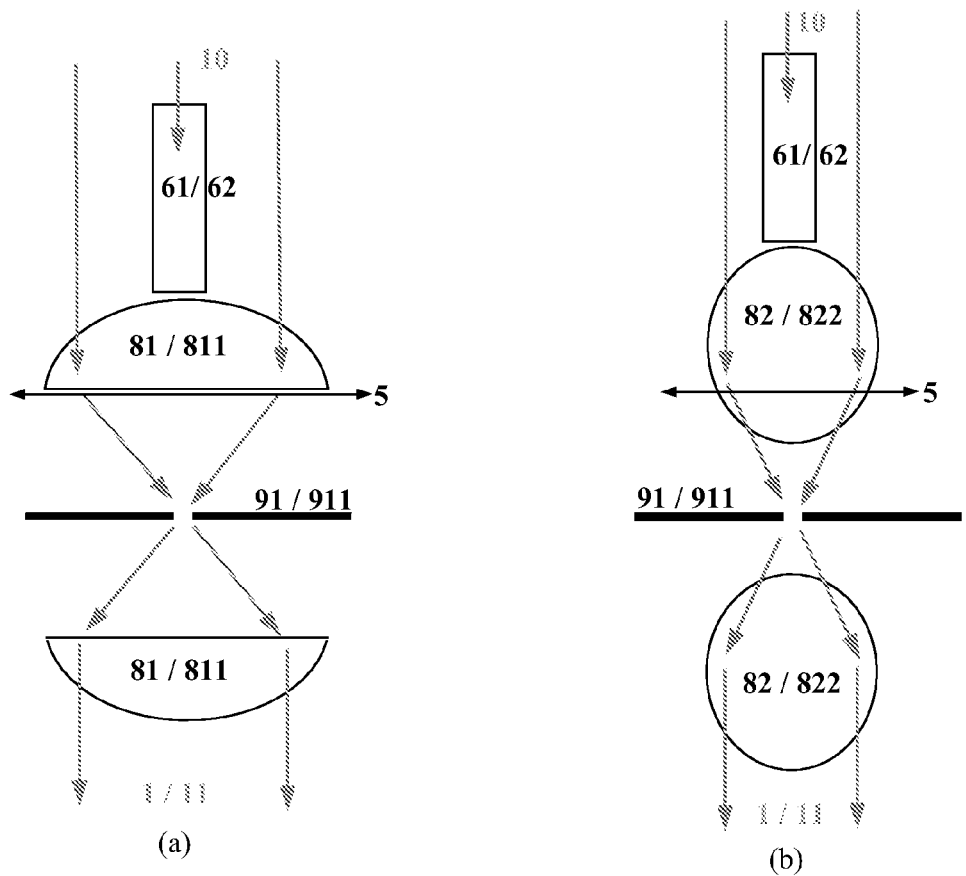
FIG. 12*a* is another version of the optical system in FIG. 11*a*, wherein a wave guide 61 (e.g. an optical fiber) is used to deliver wave signals 10 (e.g. light) to said first achromatic-doublet/plano-convex/biconvex lens 811. The rest of the construction is exactly the same as in FIG. 11*a*. In the case of modifying the optical system in FIG. 8*a*, wave guides 62 (e.g. optical fibers) are used to deliver wave signals 10 (e.g. light) to said first cylindrical achromatic-doublet/plano-convex/biconvex lens 81. In the latter case, the rest of the construction is exactly the same as in FIG. 8*a*.
FIG. 12*b* is another version of the optical system in FIG. 11*b*, wherein a wave guide 61 (e.g. an optical fiber) is used to deliver wave signals 10 (e.g. light) to said first ball lens 822. The rest of the construction is exactly the same as in FIG. 11*b*. In the case of modifying the optical system in FIG. 8*b*, wave guides 62 (e.g. optical fibers) are used to deliver wave signals 10 (e.g. light) to said first rod lens 82. In the latter case, the rest of the construction is exactly the same as in FIG. 8*b*.
Figure 13:
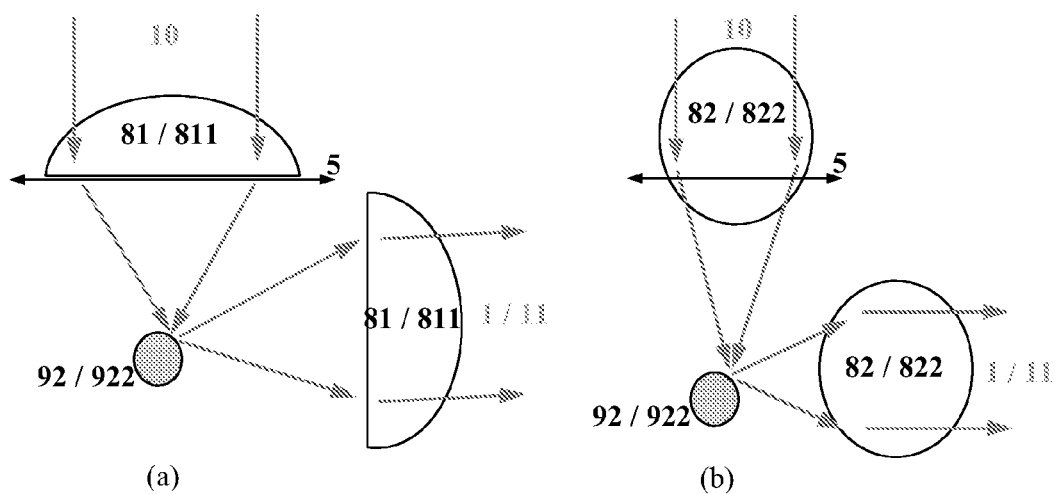
FIG. 13*a* is a diagrammatic two dimensional illustration (a cut section) of an optical system for delivery of parallel/collimated wave signals 1 (e.g. light), comprising a pair of a first and a second achromatic-doublet/plano-convex/biconvex lenses 811 and either a reflecting ball 922 or a reflecting needle/rod 92. The two-sided arrow 5 represents the direction according to which said first achromatic-doublet/plano-convex/biconvex lens 811 can be translated slowly and/or with small steps to achieve a scanning system. The thick gray arrows show how the wave signals are transmitted/reflected and propagated through the optical system. This figure also presents a diagrammatic two dimensional illustration (a cut section) of the optical system in FIG. 9*a*.
FIG. 13*b* is a diagrammatic two dimensional illustration (a cut section) of an optical system, for delivery of parallel/collimated light 1, comprising a pair of a first and a second ball lenses 822 and either a reflecting ball 922 or a reflecting needle/rod 92. The two-sided arrow 5 represents the direction according to which said first ball lens 822 can be translated slowly and/or with small steps to achieve a scanning system. The thick gray arrows show how the wave signals are transmitted/reflected and propagated through the optical system. This figure also presents a diagrammatic two dimensional illustration (a cut section) of the optical system in FIG. 9*b*.
Figure 14:
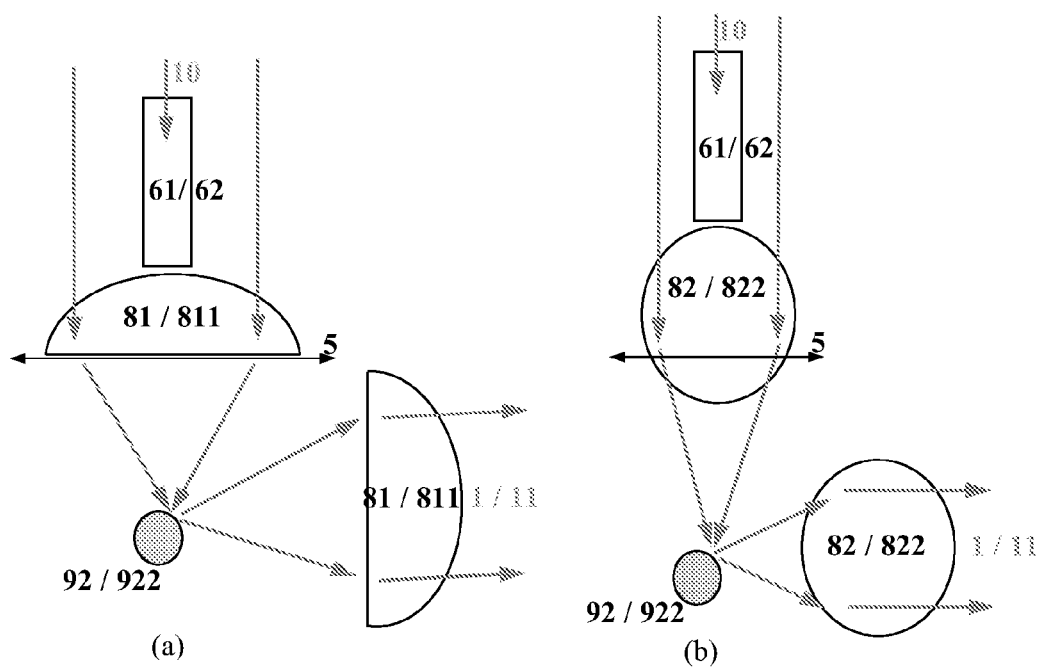
FIG. 14*a* is another version of the optical system in FIG. 13*a*, wherein a wave guide 61 (e.g. an optical fiber) is used to deliver wave signals 10 (e.g. light) to said first achromatic-doublet/plano-convex/biconvex lens 811. The rest of the construction is exactly the same as in FIG. 13*a*. In the case of modifying the optical system in FIG. 9*a*, wave guides 62 (e.g. optical fibers) are used to deliver wave signals 10 (e.g. light) to said first cylindrical achromatic-doublet/plano-convex/biconvex lens 81. In the latter case, the rest of the construction is exactly the same as in FIG. 9*a*.
FIG. 14*b* is another version of the optical system in FIG. 13*b*, wherein a wave guide 61 (e.g. an optical fiber) is used to deliver wave signals 10 (e.g. light) to said first ball lens 822. The rest of the construction is exactly the same as in FIG. 13*b*. In the case of modifying the optical system in FIG. 9*b*, wave guides 62 (e.g. optical fibers) are used to deliver wave signals 10 (e.g. light) to said first rod lens 82. In the latter case, the rest of the construction is exactly the same as in FIG. 9*b*.

In the third group of embodiments, 2D-instantaneous hyperspectral cameras can be built according to FIG. 6, wherein an imaging sensor 42 (a matrix of sensor elements) is used to capture the interference patterns generated by the many parallel cylindrical convex mirrors 25 reflecting the incoming parallel light signals 12 which can be delivered by an optical system built of lenses and/or mirrors, as described by FIGS. 10, 11 and 13.

In the embodiments described above, said parallel cylindrical convex mirrors (which generate the interference patterns) as well as said optical systems, which deliver parallel/collimated light signals, must be made of suitable materials to be able to function properly with the wave signals to be measured/analyzed, which can be visible light, near ultraviolet, ultraviolet, near infrared, infrared, X-rays, ultrasound, microwave or radio signals.

In the embodiments described above, the size/dimensions of said parallel cylindrical mirrors as well as the distance between them, the distance and the angle between said parallel cylindrical mirrors and said imaging sensor must be optimized to be able generate well-resolved interference patterns that contain enough information to be able to achieve the desired spectral resolution of the wave signals of interest, and within the spectral region of interest.

In addition to that, in the embodiments described above, said imaging sensors must be able to sense and capture the generated interference patterns, which also means that said imaging sensors should have proper resolutions which are high enough to resolve the fine details of said interference patterns.

Figure 15:
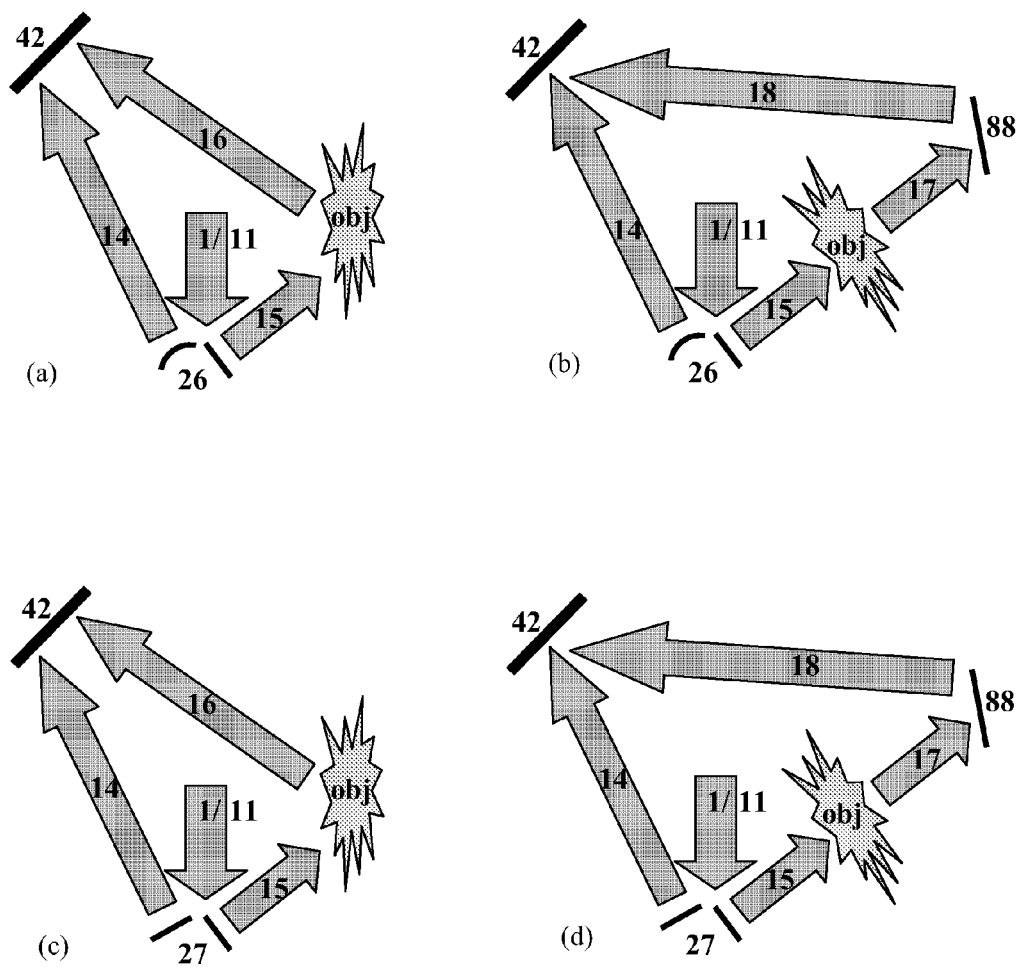
FIG. 15*a* is a diagrammatic two dimensional illustration (a cut section) of an interferometer, wherein a pair 26 of a plane mirror and a convex mirror are used to split incoming wave signals 1 or 11 (e.g. light signals) into two parts, one of them 15 is reflected by the object/sample of interest obj to produce 16 which interferes with the other (reference/unchanged) part 14. A cylindrical convex mirror can be used instead of using said convex mirror, and in this case, said plane mirror and said cylindrical convex mirror must have parallel axes in addition to being of the same length.
FIG. 15*b* is a diagrammatic two dimensional illustration (a cut section) of an interferometer, wherein a pair 26 of a plane mirror and a convex mirror are used to split incoming wave signals 1 or 11 (e.g. light signals) into two parts, one of them 15 will first pass through the object/sample of interest obj to produce 17, then will be reflected by a plane mirror 88 to produce 18 which interferes with the other (reference/unchanged) part 14. A cylindrical convex mirror can be used instead of using said convex mirror, and in this case, said plane mirror and said cylindrical convex mirror must have parallel axes in addition to being of the same length.
FIG. 15*c* shows a cut section of another version of the interferometer in FIG. 15*a*, wherein said convex-mirror/cylindrical-convex-mirror is replaced by a plane mirror. The resulting pair of plane mirrors 27 is used to split incoming wave signals (e.g. light signals) into two parts.
FIG. 15*d* shows a cut section of another version of the interferometer in FIG. 15*b*, wherein said convex-mirror/cylindrical-convex-mirror is replaced by a plane mirror. The resulting pair of plane mirrors 27 is used to split incoming wave signals (e.g. light signals) into two parts.

In the fourth group of embodiments, interferometers can be built according to FIGS. 15a and 15c, wherein either a pair 26 of a plane mirror and a convex mirror or a pair 27 of two plane mirrors, respectively, are used to split incoming light signals 1 into two parts, one of them 15 is reflected by the object/sample of interest obj to produce 16 which interferes with the other (reference/unchanged) part 14. In the case of using a cylindrical convex mirror instead of said convex mirror, said plane mirror and said cylindrical convex mirror must have parallel axes in addition to being of the same length.

In the fifth group of embodiments, interferometers can be built according to FIGS. 15b and 15d, wherein either a pair 26 of a plane mirror and a convex mirror or a pair 27 of two plane mirrors, respectively, are used to split incoming light signals 1 into two parts, one of them 15 will first pass through the object/sample of interest obj, to produce 17 which will then be reflected by a plane mirror 88 to produce 18 which interferes with the other (reference/unchanged) part 14. In the case of using a cylindrical convex mirror instead of said convex mirror, said plane mirror and said cylindrical convex mirror must have parallel axes in addition to being of the same length.

Figure 16:
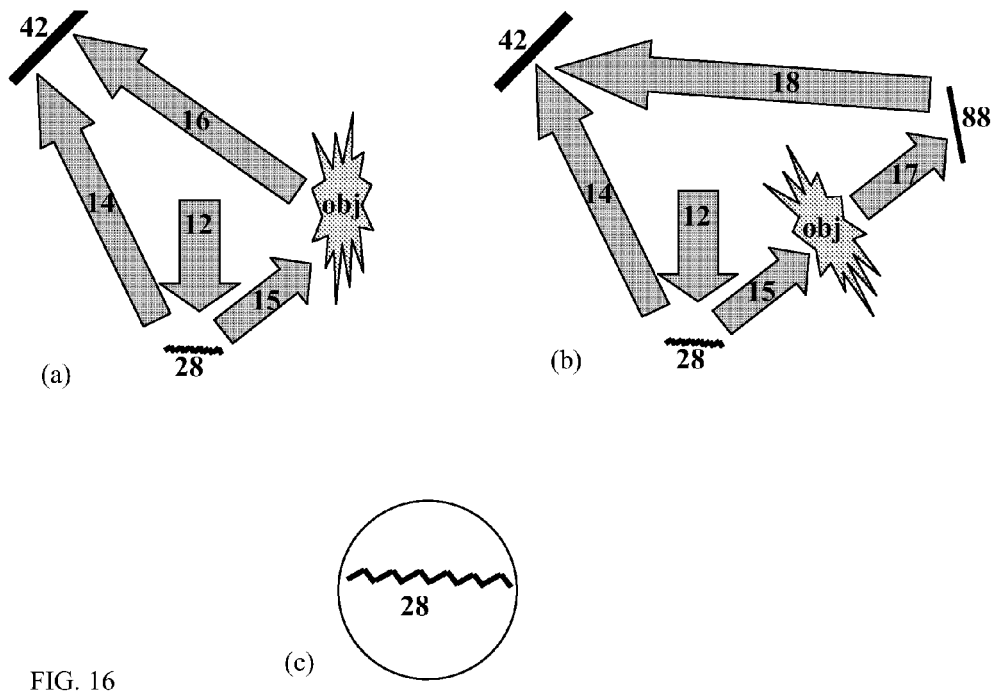
FIG. 16*a* shows a cut section of another version of the interferometer in FIG. 15*c*, wherein a reflective grid comprising lattice elements (gitter) 28 is used instead of using said pair of plane mirrors 27. In said grid comprising lattice elements (gitter) 28, the elements have the same structure as said pair of plane mirrors 27 to split incoming wave signals (e.g. light signals) into two parts. Overlapping interference patterns are generated when said two parts of wave signals (14 and 16) meet each others, and a matrix of imaging sensors 42 can be used to capture said interference patterns.
FIG. 16b shows a cut section of another version of the interferometer in FIG. 15d, wherein a reflective grid comprising lattice elements (gitter) 28 is used instead of using said pair of plane mirrors 27. In said grid comprising lattice elements (gitter) 28, the elements have the same structure as said pair of plane mirrors 27 to split incoming wave signals (e.g. light signals) into two parts. Overlapping interference patterns are generated when said two parts of wave signals (14 and 18) meet each others, and a matrix of imaging sensors 42 can be used to capture said interference patterns.
FIG. 16c shows a cut section of the reflective grid comprising lattice elements (gitter) 28 used in FIGS. 16a and 16b. Said grid is built of tilted plane mirrors to be able to split incoming wave signals 12 (e.g. light signals) into two parts.

In the sixth group of embodiments, interferometers can be built according to FIG. 16a, wherein a grid comprising lattice elements (gitter) 28 built of lattice elements, which have the same structure as said pair of plane mirrors 27 in FIG. 15c, to split incoming wave signals 12 (e.g. light signals) into two parts, one of them 15 is reflected by the object/sample of interest obj to produce 16 which interferes with the other (reference/unchanged) part 14. Using a low interferable wave signal (e.g. a low interferable light signal) will result in a tomography imaging system.

In the seventh group of embodiments, interferometers can be built according to FIG. 16b, wherein a grid comprising lattice elements (gitter) 28 built of lattice elements, which have the same structure as said pair of plane mirrors 27 in FIG. 15d, to split incoming wave signals 12 (e.g. light signals) into two parts, one of them 15 will first pass through the object/sample of interest obj, to produce 17 which will then be reflected by a plane mirror 88 to produce 18 which interferes with the other (reference/unchanged) part 14.

In the fourth, fifth, sixth and seventh groups of embodiments, said mirrors as well as said optical systems (which can be a waveguide/optical-fiber and/or an optical system built of lenses and/or mirrors) which delivers parallel/collimated light signals, must be made of suitable materials to be able to function properly with the wave signals of interest (to be measured/analyzed), which can be visible light, near ultraviolet, ultraviolet, near infrared, infrared, X-rays, ultrasound, microwave or radio signals.

In the fourth, fifth, sixth and seventh groups of embodiments, the size/dimensions of said parallel cylindrical mirrors as well as the distance between them, the distance and the angle between said parallel cylindrical mirrors and said imaging sensor must be optimized to be able to generate well-resolved interference patterns that contain enough information to be able to achieve the desired spectral resolution of the wave signals of interest, and within the spectral region of interest.

Furthermore, in the fourth, fifth, sixth and seventh groups of embodiments, the imaging sensors must be able to sense and capture the generated interference patterns, which also means that they should have proper resolutions which are high enough to resolve the fine details of the these interference patterns.

Finally, for all of the embodiments described above, other variants can be built by replacing said cylindrical convex mirrors by cylindrical concave mirrors, and/or replacing said convex mirrors by concave mirrors.

Note that a waveguide/optical-fiber (included in the units referred to as 61 and 62) may also comprise suitable necessary optical components at one or both of its ends to be able to deliver parallel light signals (referred to as 1 and 11).

In the first group of embodiments, the two parallel cylindrical convex mirrors 23 can be replaced by two convex mirrors 231 (not cylindrical) and either an imaging sensor 41 (a line of sensor elements) or an imaging sensor 42 (a matrix of sensor elements) can be used to capture the interference patterns.

In the previous groups of embodiments, the many parallel cylindrical convex mirrors 25 can be replaced by a matrix of convex mirrors 251 as shown in FIG. 18.

Separation of Partially-Overlapping Interference Patterns

Figure 17:
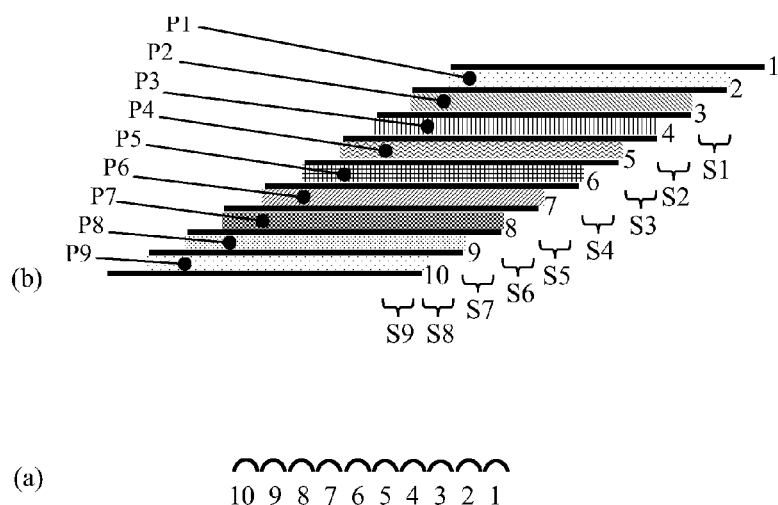
FIG. 17a shows a cut section of a reflective grid comprising lattice elements (gitter), comprising ten parallel cylindrical convex mirrors numbered from 1 to 10, which is of the same type used for hyperspectral cameras that can capture instantaneous 2D hyperspectral images.
FIG. 17b shows a symbolic illustration of the regions/ranges of the interference patterns generated by said grid comprising lattice elements (gitter) in FIG. 17a. The horizontal thick black lines, numbered from 1 to 10, show the regions/ranges of the wave signals (e.g. light signals) reflected by the corresponding mirrors of said grid comprising lattice elements (gitter), while the patterned areas (denoted by P1-P9) show the interference patterns generated by each two neighboring partially-overlapping wave signals reflected by two neighboring cylindrical convex mirrors of said grid comprising lattice elements (gitter). The sum of said partially-overlapping interference patterns is what an imaging sensor can capture. The terms denoted by S1-S9 represent some partial sums of partially-overlapping interference patterns.

It is important to separate partially-overlapping interference patterns to be able to make a camera that can capture instantaneous 2D hyperspectral images. FIG. 17*b* shows a symbolic illustration of the regions/ranges of the interference patterns generated by a reflective grid comprising lattice elements (gitter), comprising a number of parallel cylindrical convex mirrors; namely ten such mirrors numbered from 1 to 10, as shown in FIG. 17*a*. The horizontal thick black lines, numbered from 1 to 10, show the regions/ranges of the wave signals (e.g. light signals) reflected by the corresponding mirrors of said grid comprising lattice elements (gitter), while the patterned areas (denoted by P1-P9) show the interference patterns generated by each two neighboring partially-overlapping wave signals reflected by two neighboring cylindrical convex mirrors of said grid comprising lattice elements (gitter).

The sum of said partially-overlapping interference patterns is what an imaging sensor can capture. The terms denoted by S1-S9 represent some partial sums of partially-overlapping interference patterns. Said partial sums can be used to be able to estimate said patterned areas' (P1-P9) spectra. One simple way for doing that is to at first identify and extract, then transform each of said partial sums (S1-S9) to Fourier domain and finally solve a system of linear equations to estimate the spectra of said interference patterns (P1-P9).

Note that the higher the number of said parallel mirrors of said grid comprising lattice elements (gitter), the higher spatial resolution of the hyperspectral image is obtained. It is also necessary to perform digital correction to straighten the interference fringes (interference fringes corresponds to interference patterns) to give correct spectra after Fourier Transformation. However, it is possible to use spectra generated without applying any correction to the interference patterns.

It is possible to estimate said interference patterns (P1-P9) by using methods of source separation of mixed signals, instead of the separation method described above.

It is also possible to use a reflective grid comprising lattice elements (gitter) consisting of a matrix of convex mirrors instead of parallel cylindrical convex mirrors. The said separation process will then be performed in two dimensions instead of one dimension as described previously in this section. The overlapping will in the new case occur in all directions.

Although the invention has been described in terms of preferred embodiments, it will be understood that modifications and variation may be made without departing from the true spirit and scope thereof as set out in the following claims.

The invention claimed is:

1. A Holographic Fourier Transform Imaging Spectrometer, HFTIS, comprising:
a wave-signal collecting unit for delivering collimated wave signals (1 or 11); a pair of parallel cylindrical mirrors (23 or 24) for generating an interference pattern from the wave signals; an imaging sensor (41 or 42) for capturing the interference pattern; and a computation unit for performing digital correction of the captured interference pattern, to straighten the captured interference pattern and thereby provide correct spectra after Fourier Transformation.

2. A Holographic Fourier Transform Imaging Spectrometer, HFTIS, comprising: a wave-signal collecting unit for delivering collimated wave signals (12); a number of parallel cylindrical mirrors (25) for generating partially overlapping interference patterns; an imaging sensor (42) for capturing the interference patterns; and a computation unit for performing either extraction/estimation of each interference pattern, or extraction/estimation of the spectrum of each interference pattern, in addition to digital correction to straighten the interference patterns to provide correct spectra after Fourier Transformation.

3. The HFTIS of claim 1, wherein said imaging sensor is either a CMOS or a CCD imaging sensor array, covering the near ultra-violet, visible and/or near infrared spectral ranges, and said wave-signal collecting unit as well as said pair of parallel cylindrical mirrors are optimized for near ultraviolet, visible and/or near infrared (NIR) wave-signals; said sensors can either be of a single-layered or a multi-layered type; and said sensors are of a cooled or a non-cooled type.

4. The HFTIS of claim 1, wherein said imaging sensor is an infrared imaging sensor array, covering the near, short-wave, mid-wave, long-wave and/or very-long wave infrared spectral ranges, and said wave-signal collecting unit as well as said pair of parallel cylindrical mirrors are optimized for near, short-wave, mid-wave, long-wave and/or very-long wave infrared signals, respectively; and said sensors are of a cooled or a non-cooled type.

5. The HFTIS of claim 1, wherein said imaging sensor is an ultraviolet imaging sensor array, and said wave-signal collecting unit as well as said pair of parallel cylindrical mirrors are optimized for ultraviolet wave-signals.

6. The HFTIS of claim 1, wherein said imaging sensor is an ultrasound imaging sensor array, and said wave-signal collecting unit as well as said pair of parallel cylindrical mirrors are optimized for ultrasound wave-signals.

7. The HFTIS of claim 1, wherein said imaging sensor is a X-ray imaging sensor array, and said wave-signal collecting unit as well as said pair of parallel cylindrical mirrors are optimized for X-ray wave-signals.

8. The HFTIS of claim 1, wherein said imaging sensor is a radio-frequency or a microwave sensor array, and said wave-signal collecting unit as well as said pair of parallel cylindrical mirrors are optimized for radio-frequency or microwave wave-signals, respectively.

9. The HFTIS according to claim 3, wherein said wave-signal collecting unit comprises a pair of a concave mirror (866) and a convex mirror (855) which can be either parabolic or spherical mirrors; said concave mirror (866) focuses the wave-signals (10) on said convex mirror (855) which gives parallel/collimated wave-signals (11) which pass through either a pinhole at the centre of said concave mirror (866) or a narrow slit situated in the middle of said concave mirror (866); said parallel/collimated wave-signals (11) hit said pair of parallel cylindrical mirrors which generate interference patterns which are detected by said imaging sensor array which comprises either a matrix of sensor elements or a single line of sensor elements.

10. The HFTIS according to claim 3, wherein said wave-signal collecting unit comprises a pair of a cylindrical concave mirror (86) and a cylindrical convex mirror (85), which can be a reflecting needle/rod, where the axes of said pair of mirrors are parallel; said cylindrical concave mirror (86) focuses the wave-signals on said cylindrical convex mirror (85) which gives parallel/collimated wave-signals (11) which pass through a narrow slit in the middle of said cylindrical concave mirror; said narrow slit is parallel to the axis of said cylindrical concave mirror; said parallel/collimated wave-signals hit said pair of parallel cylindrical mirrors which generate interference patterns which are detected by said imaging sensor array which comprises either a matrix of sensor elements (42) or a single line of sensor elements (41); and the axis of said pair of parallel cylindrical mirrors are parallel to said narrow slit.

11. The HFTIS according to claim 3, wherein said wave-signal collecting unit comprises at least one waveguide/optical-fiber, and said imaging sensor array comprises either a matrix of sensor elements or a single line of sensor elements.

12. The HFTIS according to claim 3, wherein said wave-signal collecting unit comprises a pair of a first and a second achromatic-doublet/plano-convex/biconvex lenses (811) and a pinhole (911), and said imaging sensor array comprises either a matrix of sensor elements (42) or a single line of sensor elements (41); wherein digital aberration correction is used to compensate for the impact of said lenses' and other refractive components.

13. The HFTIS according to claim 3, wherein said wave-signal collecting unit comprises a pair of a first and a second ball lenses (822) and a pinhole (911), and said imaging sensor array comprises either a matrix of sensor elements (42) or a single line of sensor elements (41); wherein digital aberration correction is used to compensate for the impact of said lenses' and other refractive components.

14. The HFTIS according to claim 3, wherein said wave-signal collecting unit comprises a pair of a first and a second achromatic-doublet/plano-convex/biconvex lenses (811) and either a reflecting ball (922) or a reflecting needle/rod (92), and said imaging sensor array comprises either a matrix of sensor elements (42) or a single line of sensor elements (41); wherein digital aberration correction is used to compensate for the impact of said lenses' and other refractive components.

15. The HFTIS according to claim 3, wherein said wave-signal collecting unit comprises a pair of a first and a second ball lenses (822) and either a reflecting ball (922) or a reflecting needle/rod (92), and said imaging sensor array comprises either a matrix of sensor elements (42) or a single line of sensor elements (41); wherein digital aberration correction is used to compensate for the impact of said lenses' and other refractive components.

16. The HFTIS according to claim 3, wherein said wave-signal collecting unit comprises a pair of a first and a second cylindrical achromatic-doublet/plano-convex/biconvex lenses (81) and a narrow slit (91), and said imaging sensor array comprises a matrix of sensor elements (42); the axis of said pair of parallel cylindrical mirrors (24) is parallel to said narrow slit (91); wherein digital aberration correction is used to compensate for the impact of said lenses' and other refractive components.

17. The HFTIS according to claim 3, wherein said wave-signal collecting unit comprises a pair of a first and a second rod lenses (82) and a narrow slit (91), and said imaging sensor array comprises a matrix of sensor elements (42); the axis of said pair of parallel cylindrical mirrors (24) is parallel to said narrow slit (91); wherein digital aberration correction is used to compensate for the impact of said lenses' and other refractive components.

18. The HFTIS according to claim 3, wherein said wave-signal collecting unit comprises a pair of a first and a second cylindrical achromatic-doublet/plano-convex/biconvex lenses (81) and a reflecting needle/rod (92), and said imaging sensor array comprises a matrix of sensor elements (42); the axis of said pair of parallel cylindrical mirrors (24) is parallel to the axis of said reflecting needle/rod (92); wherein digital aberration correction is used to compensate for the impact of said lenses' and other refractive components.

19. The HFTIS according to claim 3, wherein said wave-signal collecting unit comprises a pair of a first and a second rod lenses (82) and a reflecting needle/rod (92), and said imaging sensor array comprises a matrix of sensor elements (42); the axis of said pair of parallel cylindrical mirrors (24) is parallel to the axis of said reflecting needle/rod (92); wherein digital aberration correction is used to compensate for the impact of said lenses' and other refractive components.

20. The HFTIS according to claim 16, wherein at least one waveguide/optical-fiber (61 or 62) is used to deliver wave-signals (10) to said wave-signal collecting unit; the resulting construction is a multi-input HFTIS which can simultaneously measure a number of wave-signals.

21. The HFTIS of claim 2, wherein said imaging sensor (42) is either a CMOS or a CCD imaging sensor array, covering the near ultraviolet, visible and/or near infrared spectral ranges, and said wave-signal collecting unit as well as said parallel cylindrical mirrors (25) are optimized for near ultraviolet, visible and/or near infrared (NIR) wave-signals; said sensors can either be of a single-layered or a multi-layered type; and said sensors are of a cooled or a non-cooled type.

22. The HFTIS of claim 2, wherein said imaging sensor (42) is an infrared imaging sensor array, covering the near, short-wave, mid-wave, long-wave and/or very-long wave infrared spectral ranges, and said wave-signal collecting unit as well as said parallel cylindrical mirrors (25) are optimized for near, short-wave, mid-wave, long-wave and/or very-long wave infrared signals, respectively; and said sensors are of a cooled or a non-cooled type.

23. The HFTIS of claim 2, wherein said imaging sensor (42) is an ultraviolet imaging sensor array, and said wave-signal collecting unit as well as said pair of parallel cylindrical mirrors (25) are optimized for ultraviolet wave-signals.

24. The HFTIS of claim 2, wherein said imaging sensor (42) is an ultrasound imaging sensor array, and said wave-signal collecting unit as well as said parallel cylindrical mirrors (25) are optimized for ultrasound wave-signals.

25. The HFTIS of claim 2, wherein said imaging sensor (42) is a X-ray imaging sensor array, and said wave-signal collecting unit as well as said parallel cylindrical mirrors (25) are optimized for X-ray wave-signals.

26. The HFTIS of claim 2, wherein said imaging sensor (42) is a radio-frequency or a microwave sensor array, and said wave-signal collecting unit as well as said parallel cylindrical mirrors (25) are optimized for radio-frequency or microwave wave-signals, respectively.

27. The HFTIS according to claim 21, wherein said wave-signal collecting unit comprises a pair of a concave mirror (866) and a convex mirror (855) which is either parabolic or spherical mirrors; said concave mirror (866) focuses the wave-signals on said convex mirror (855) which give parallel/collimated wave-signals which pass through a hole at the centre of said concave mirror (866); said parallel/collimated wave-signals (11) hit said parallel cylindrical mirrors (25) which generate interference patterns which are detected by said imaging sensor array which comprises a matrix of sensor elements (42).

28. The HFTIS according to claim 21, wherein said wave-signal collecting unit comprises a pair of a first and a second achromatic-doublet/plano-convex/biconvex lenses (811) and a hole (911), and said imaging sensor array comprises a matrix of sensor elements (42); wherein digital aberration correction is used to compensate for the impact of said lenses' and other refractive components.

29. The HFTIS according to claim 21, wherein said wave-signal collecting unit comprises a pair of a first and a second achromatic-doublet/plano-convex/biconvex lenses (811) and a reflecting ball (922), and said imaging sensor array comprises a matrix of sensor elements (42); wherein digital aberration correction is used to compensate for the impact of said lenses' and other refractive components.

30. The HFTIS according to claim 1, wherein a certain spectral region can be zoomed in/out by optimizing and changing the distance between said parallel cylindrical mirrors, and/or by optimizing and changing the distance between said imaging sensor array and said parallel cylindrical mirrors which generate the interference patterns and keeping the same angle between the planes containing them; the interference patterns are magnified because they are fan-shaped and spread out from said parallel cylindrical mirrors towards said imaging sensor array; the magnification factor can also be changed by changing the convexity of said parallel cylindrical mirrors by using deformable mirrors; said magnification factor is larger or smaller than one.

31. The HFTIS according to claim 1, wherein a certain spectral region can be zoomed in/out by optimizing and changing the distance between said parallel cylindrical mirrors, and/or by optimizing and rotating said imaging sensor array and/or said parallel cylindrical mirrors with respect to each other, in addition to translating one or both of them properly to optimize and change the distance between them, to be able to capture the magnified interference patterns; the interference patterns are magnified because they are fan-shaped and spread out from said parallel cylindrical mirrors towards said imaging sensor array; the magnification factor can also be changed by changing the convexity of said parallel cylindrical mirrors by using deformable mirrors; said magnification factor is larger or smaller than one.

32. The HFTIS according to claim 12, wherein said first lens, in said wave-signal collecting unit, is translated by small steps with respect to said narrow slit, said pinhole, said reflecting ball, said reflecting rod or said reflecting needle, respectively, so that said narrow slit, said pinhole, said reflecting ball, said reflecting rod or said reflecting needle will still be positioned at the focal plane of said first lens, but will at each time for every said small step be located at a new position to let a new line of the imaged scene to pass through the wave-signal collecting unit, and hit said pair of parallel cylindrical mirrors and generate interference patterns; the generated interference patterns are captured after each said small-step movement, and converted into spectra with Fourier Transform after digital correction to straighten the interference patterns; the result is a line-scanning HFTIS which can capture two-dimensional hyperspectral images.

33. The HFTIS according to claim 12, wherein said imaging sensor array comprises a single line of sensor elements (41) instead of a matrix of sensor elements (42), and is translated by small steps along a perpendicular axis to the axis of said line of sensor elements (41) so that said translation occurs within the plane built by said perpendicular axes which is the same plane built by the surfaces of said sensor elements (41), so that incoming parallel light passing through said narrow slit, said pinhole, said reflecting ball, said reflecting rod or said reflecting needle, respectively, and reflected by said pair of parallel cylindrical mirrors to generate interference patterns, which are captured by said line of sensor elements (41) after each said small-step movement, and converted into spectra with Fourier Transform after digital correction to straighten the interference patterns, resulting in a scanning HFTIS which can capture a one-dimensional hyperspectral row/column; and, in the case where the scanning results in varying distance between the axis of said line of sensor elements and the region of said parallel cylindrical mirrors from where said interference patterns are generated and detected by said line of sensor elements (41), a zooming in/out of certain spectral regions is obtained, if the incoming parallel wave-signals along said parallel cylindrical mirrors have the same spectral content.

34. The HFTIS according to claim 9, wherein said pair of a concave mirror (866) and a convex mirror (855, which delivers parallel/collimated wave signals) is translated with small steps so that said pair of parallel cylindrical mirrors will at each time for every said small step be located at a new position to generate interference patterns for a new line or a new point of the imaged scene; wherein the generated interference patterns are captured after each said small-step movement, and converted into spectra with Fourier Transform after digital correction to straighten the interference patterns, resulting in a line-scanning, respectively, a pixel-scanning HFTIS which is for capturing two-dimensional hyperspectral images.

35. The HFTIS according to claim 9, wherein said pair of a concave mirror (866) and a convex mirror (855) delivers parallel/collimated wave signals to a plane mirror (87), which reflects said parallel/collimated wave signals (11) at 45-degrees angle and delivers them (111) to said pair of parallel cylindrical mirrors (24); said plane mirror (87) is translated with small steps so that said pair of parallel cylindrical mirrors (24) will at each time for every said small step be located at the same place and receive said parallel/collimated wave signals (111) representing a new line of the imaged scene; the generated interference patterns are captured by an imaging sensor (42) after each said small-step movement, and converted into spectra with Fourier Transform after digital correction to straighten the interference patterns, resulting in a line-scanning HFTIS which can capture two-dimensional hyperspectral images.

36. The HFTIS according to claim 9, wherein said pair of a concave mirror (866) and a convex mirror (855) delivers parallel/collimated wave signals (11) to a plane mirror (87), which reflects said parallel/collimated wave signals (11) at 45-degrees angle and delivers them (111) to said pair of parallel cylindrical mirrors (23 or 24); said plane mirror (87) is translated with small steps so that said pair of parallel cylindrical mirrors (23 or 24) will at each time for every said small step be located at the same place and receive said parallel/collimated wave signals (111) representing either a new point or a new line, respectively, of the imaged scene; the generated interference patterns are captured by an imaging sensor (41 or 42, respectively) after each said small-step movement, and converted into spectra with Fourier Transform after digital correction to straighten the interference patterns, resulting in a pixel-scanning, respectively a line-scanning HFTIS which is for capturing either a one-dimensional hyperspectral line/row/column or a two-dimensional hyperspectral images, respectively.

37. The HFTIS according to claim 9, wherein said pair of a concave mirror (866) and a convex mirror (855) delivers parallel/collimated wave signals (11) to a plane mirror (87), which reflects said parallel/collimated wave signals (11) at 45-degrees angle and delivers them (111) to said pair of parallel cylindrical mirrors (23); said pair of a concave mirror (866) and a convex mirror (855, which delivers parallel/collimated wave signals) is translated with small steps so that said pair of parallel cylindrical mirrors (23) will at each time for every said small step be located properly to receive said parallel/collimated wave signals representing a new point of the imaged scene; the generated interference patterns are captured by an imaging sensor (41) after each said small-step movement, and converted into spectra with Fourier Transform after digital correction to straighten the interference patterns, resulting in a pixel-scanning HFTIS which is for capturing two-dimensional hyperspectral images since two-dimensional scanning (e.g. row-wise or column-wise) is performed.

38. The HFTIS according to claim 10, wherein said pair of a cylindrical concave mirror (86) and a cylindrical convex mirror (85) delivers parallel/collimated wave signals (11) to a plane mirror (87), which reflects said parallel/collimated wave signals at 45-degrees angle and delivers them (111) to said pair of parallel cylindrical mirrors (24); said plane mirror (87) is translated with small steps so that said pair of parallel cylindrical mirrors (87) will at each time for every said small step be located at the same place and receive said parallel/collimated wave signals (111) representing a new line of the imaged scene; the generated interference patterns are captured by an imaging sensor (42) after each said small-step movement, and converted into spectra with Fourier Transform after digital correction to straighten the interference patterns, resulting in a line-scanning HFTIS which is for capturing two-dimensional hyperspectral images.

39. The HFTIS according to claim 10, wherein said pair of a cylindrical concave mirror (86) and a cylindrical convex mirror (85) delivers parallel/collimated wave signals (11) to a plane mirror (87), which reflects said parallel/collimated wave signals (11) at 45-degrees angle and delivers them (111) to said pair of parallel cylindrical mirrors (23); said plane mirror is translated with small steps so that said pair of parallel cylindrical mirrors (23) will at each time for every said small step be located at the same place and receive said parallel/collimated wave signals (111) representing a new point of the imaged scene; the generated interference patterns are captured by an imaging sensor (41) after each said small-step movement, and converted into spectra with Fourier Transform after digital correction to straighten the interference patterns, resulting in a pixel-scanning HFTIS which is for capturing a one-dimensional hyperspectral line/row/column.

40. The HFTIS according to claim 10, wherein said pair of a cylindrical concave mirror (86) and a cylindrical convex mirror (85) delivers parallel/collimated wave signals (11) to a plane mirror (87), which reflects said parallel/collimated wave signals (11) at 45-degrees angle and delivers them (111) to said pair of parallel cylindrical mirrors (23); said pair of a cylindrical concave mirror (86) and a cylindrical convex mirror (85, which delivers parallel/collimated wave signals 11) is translated with small steps so that said pair of parallel cylindrical mirrors (23) will at each time for every said small step be located properly to receive said parallel/collimated wave signals (111) representing a new point of the imaged scene; the generated interference patterns are captured after each said small-step movement, and converted into spectra with Fourier Transform after digital correction to straighten the interference patterns, resulting in a pixel-scanning HFTIS which is for capturing two-dimensional hyperspectral images since two-dimensional scanning (e.g. row-wise or column-wise) is performed.

41. A method for separation of partially-overlapping interference patterns, generated by a reflective grid (25) comprising a number of parallel cylindrical convex mirrors, to be able to make a camera that is for capturing instantaneous 2D hyperspectral images; partial sums of partially-overlapping interference patterns are used to be able to extract and estimate the spectra of said interference patterns as follows: identify and extract, then transform each of said partial sums to Fourier domain and finally solve a system of linear equations to estimate the spectra of said interference patterns.

42. The HFTIS according to claim 1, said cylindrical convex mirrors have been replaced by cylindrical concave mirrors, and/or wherein said convex mirrors have been replaced by concave mirrors.

43. The HFTIS according to claim 1, wherein no digital correction is applied to any said interference pattern.

44. The HFTIS according to claim 1, wherein a certain spectral region can be zoomed in/out by optimizing and changing the size/dimensions of said parallel cylindrical mirrors; wherein changing the size or dimensions of the parallel cylindrical mirrors makes it possible to zoom in/out a certain part of the electromagnetic spectrum, respectively.

45. The HFTIS according to claim 1, wherein said pair of parallel cylindrical mirrors (23) is replaced by a pair of convex mirrors (231) that are not cylindrical.

46. The HFTIS according to claim 1, wherein said pair of parallel cylindrical mirrors (23) is replaced by either a pair of cylindrical mirrors with varying dimensions (241) or a pair of curved cylindrical mirrors with varying dimensions (2411) to be able to add to the said HFTIS a functionality of zooming in/out a certain spectral region; wherein zooming in/out a certain spectral region can be performed by translating 241 or rotating 2411, respectively, so that said parallel/collimated wave signals (1) are reflected by a certain part of 241 or 2411 providing a certain spectral resolution.

47. The HFTIS according to claim 1, wherein said pair of parallel cylindrical mirrors (24) is replaced by a pair of cylindrical mirrors with varying dimensions (241) to compensate for the varying distance between said 241 and said imaging sensor (42), wherein the dimensions of the said cylindrical mirrors are slightly reduced when the said distance is slightly increased.

48. The HFTIS according to claim 1, wherein said parallel cylindrical mirrors (25) are replaced by a matrix of convex mirrors (251).

49. The HFTIS according to claim 48, wherein said cylindrical convex mirrors are replaced by cylindrical concave mirrors, and/or said convex mirrors are replaced by concave mirrors.

50. The HFTIS according to claim 44, wherein no said digital correction is applied to any interference pattern.

* * * * *

UNITED STATES PATENT AND TRADEMARK OFFICE
CERTIFICATE OF CORRECTION

| | | |
|---|---|---|
| PATENT NO. | : | 8,446,458 B2 |
| APPLICATION NO. | : | 12/744690 |
| DATED | : | May 21, 2013 |
| INVENTOR(S) | : | Hamed Hamid Muhammed |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 598 days.

Signed and Sealed this
Eighth Day of September, 2015

Michelle K. Lee
*Director of the United States Patent and Trademark Office*